US00RE40709E

(19) United States
(12) Reissued Patent
Akahane et al.

(10) Patent Number: US RE40,709 E
(45) Date of Reissued Patent: May 12, 2009

(54) PIEZOACTUATOR AND DRIVE CIRCUIT THEREFOR

(75) Inventors: Hidehiro Akahane, Suwa (JP); Akihiro Sawada, Suwa (JP); Makoto Furuhata, Suwa (JP)

(73) Assignee: Seiko Epson Corporation, Tokyo (JP)

(21) Appl. No.: 11/591,409

(22) Filed: Nov. 1, 2006

Related U.S. Patent Documents

Reissue of:
(64) Patent No.: 6,841,919
Issued: Jan. 11, 2005
Appl. No.: 10/109,356
Filed: Mar. 26, 2002

(30) Foreign Application Priority Data

Mar. 27, 2001 (JP) ..... 2001-91112

(51) Int. Cl.
*H01L 41/08* (2006.01)

(52) U.S. Cl. ..... 310/316.01; 310/316.02; 310/323.02

(58) Field of Classification Search ..... 310/316.01, 310/316.02, 323.02; 318/116
See application file for complete search history.

(56) References Cited

U.S. PATENT DOCUMENTS

| | | | |
|---|---|---|---|
| 5,233,274 | A | 8/1993 | Honda et al. |
| 5,563,478 | A | 10/1996 | Suganuma |
| 5,955,819 | A | 9/1999 | Takano et al. |
| 6,054,795 | A | 4/2000 | Yamamoto et al. |
| 6,064,140 | A | 5/2000 | Zumeris |
| 6,121,714 | A | 9/2000 | Atsuta |
| 6,661,154 | B2 | 12/2003 | Shibatani |

FOREIGN PATENT DOCUMENTS

| | | |
|---|---|---|
| JP | 06-014565 | 1/1994 |
| JP | 9-294384 | 11/1997 |
| JP | 09-308274 | 11/1997 |
| JP | 11-215858 | 8/1999 |
| JP | 2000-078867 | 3/2000 |
| JP | 2000-188882 | 7/2000 |
| JP | 2000-295876 | 10/2000 |
| JP | 2001-286164 | 10/2001 |

*Primary Examiner*—Mark Budd
(74) *Attorney, Agent, or Firm*—Michael T. Gabrik

(57) ABSTRACT

A piezoactuator has a diaphragm, and the diaphragm has flat piezoelectric elements that oscillate in a longitudinal oscillation mode and a sinusoidal oscillation mode. A first electrode for detecting oscillation in the longitudinal oscillation mode, and a second electrode for detecting the amplitude of oscillation in the sinusoidal oscillation mode, are disposed on the surface of the diaphragm. When the piezoactuator is driven with a drive signal, the phase difference of a first detection signal output from the first electrode and a second detection signal output from the second electrode is detected. The frequency at which the detected phase difference becomes the maximum phase difference is then obtained, and a drive signal of a matching frequency is applied to the piezoelectric elements.

17 Claims, 29 Drawing Sheets

PIEZOACTUATOR AND DRIVE CIRCUIT THEREFOR

Matter enclosed in heavy brackets [ ] appears in the original patent but forms no part of this reissue specification; matter printed in italics indicates the additions made by reissue.

TECHNICAL FIELD OF THE INVENTION

The present invention relates to a piezoelectric actuator having a piezoelectric device and to a drive circuit for the same.

RELATED ART

Piezoelectric devices feature outstanding response and efficiency converting electrical energy to mechanical energy. As a result, various types of piezoelectric actuators that use the piezoelectric effect of piezoelectric devices have been developed in recent years. These piezoactuators are used in such fields as piezoelectric buzzers, inkjet heads for printers, and ultrasonic motors. Using piezoactuators in the calendar display mechanism in wristwatches and other such applications where there is strong demand for size reductions has also been investigated in recent years.

Wristwatch calendar display mechanisms to now are generally configured to drive the date counter by indirectly transferring rotational drive power from an electromagnetic stepping motor to the date counter and such through the wheel train of the movement. Wristwatches are worn held to the wrist with a band and for the convenience of such portability are preferably thin. It is therefore necessary to also make the calendar display mechanism thin.

A thin calendar display mechanism is also desirable from the perspective of improving watch production efficiency. First, there are watches with a calendar display mechanism provided in the watch, and there are watches that are not equipped with a calendar display mechanism. Overall watch production efficiency can be improved if a common mechanical system for advancing the hands (the "movement") can be used in both watch types. This is because a production system whereby, for example, the movements are mass produced for both watch types and then assembled to the two types of watches, and the calendar display mechanism is then assembled to only the one type of watch, can be used. In order to use such a production system, however, it is necessary to be able to place the calendar display mechanism on top of the movement, that is, on the face side. In order to do this, it is necessary to configure the calendar display mechanism so that it is thin enough to fit on the face side.

While there has thus been a strong desire for thinning the calendar display mechanism, the stepping motors used in the calendar display mechanism are configured such that the coil and rotor and such parts are disposed perpendicularly to the display face, and there is a limit to how thin these can be made. Conventional calendar display mechanisms using a stepping motor are thus not suited to wristwatches that must be made thin.

It is also particularly difficult when using an electromagnetic stepping motor as the power source to make a calendar display mechanism thin enough to be placed on the face side. It has therefore been necessary to separately design and manufacture the movements depending upon whether a calendar display mechanism is included or not when watches with a calendar display mechanism and watches without a calendar display mechanism are both manufactured.

Considering this background an actuator other than a stepping motor suitable for configuring a thin calendar display mechanism has been desired. This has led to the above-noted piezoactuators being studied for use as such an actuator.

There are, however, problems related to using a piezoactuator in the calendar display mechanism of a watch.

First, displacement of the piezoelectric device is dependent upon the voltage of the supplied drive signal but is very low and normally on the submicron order. Displacement produced by the piezoelectric device is therefore amplified by some amplifying mechanism and transferred to the driven part. However, energy to drive the amplifying mechanism is also consumed when an amplifying mechanism is used, thus leading to a problem of lower efficiency. A further problem is that when an amplifying mechanism is used the size of the device becomes larger. A yet further problem is that when an amplifying mechanism is interposed it is difficult to stably transfer drive power to the driven part.

Small portable devices such as wristwatches are battery driven and it is therefore necessary to minimize power consumption and drive signal voltage. When assembling a piezoactuator into such portable devices a piezoactuator with high energy efficiency and low drive signal voltage is therefore required.

A piezoactuator having a diaphragm made from a thin rectangular piezoelectric device to which a drive signal is applied to make the piezoelectric device expand and contract lengthwise and excite longitudinal oscillations, and mechanically inducing sinusoidal oscillations by means of the longitudinal oscillations, has been proposed as a high efficiency actuator that can be included in compact devices.

By producing both longitudinal oscillations and sinusoidal oscillations in the diaphragm, this type of piezoactuator moves the part of the piezoactuator in contact with the driven part in an elliptical path. While being small and thin, this piezoactuator can drive with high efficiency.

While it is relatively easy to control the longitudinal oscillations produced by the piezoelectric device with this piezoactuator by controlling the voltage of the drive signal, easily and accurately controlling the sinusoidal oscillations induced according to the mechanical characteristics of the diaphragm is difficult. It has therefore been difficult to drive this type of piezoactuator with stability and high efficiency.

SUMMARY OF THE INVENTION

An object of this invention is to provide a drive circuit capable of stably and highly efficiently driving a piezoactuator.

To achieve this object, the present invention provides a drive circuit for a piezoactuator of which a major component is a diaphragm that is a diaphragm made from piezoelectric elements and oscillates when an ac signal is applied in a first oscillation mode and a second oscillation mode having a different oscillation direction, the piezoactuator drive circuit characterized by comprising a driver for applying a drive voltage signal that is an ac signal to the diaphragm; and a frequency control unit for detecting an electrical signal from the diaphragm representing oscillation in the first oscillation mode and an electrical signal representing oscillation in the second oscillation mode, and applying frequency control of the drive voltage signal to optimize the phase difference between these signals. This is a first embodiment (basic embodiment) of a piezoactuator drive circuit provided by the present invention.

By thus optimally controlling the phase difference, driving the piezoactuator at consistently high efficiency is enabled by the present invention.

In a preferred embodiment the frequency control unit is a circuit for frequency controlling the drive voltage signal so that the phase difference is substantially maximized. This is a second embodiment of a piezoactuator drive circuit provided by the present invention.

The frequency control unit in this case preferably has a phase difference detection circuit for detecting, for example, a phase difference between an electrical signal representing oscillation in the first oscillation mode and an electrical signal representing oscillation in the second oscillation mode; a circuit for determining a time derivative of the phase difference detected by the phase difference detection circuit; and a circuit for increasing the drive voltage signal frequency when the time derivative is positive, and decreasing the drive voltage signal frequency when negative. This is a third embodiment of a piezoactuator drive circuit provided by the present invention.

In a preferred embodiment the drive circuit further has a voltage-controlled oscillator for supplying an output signal to the driver; and the frequency control unit controls the frequency of the drive voltage signal by increasing or decreasing the frequency control voltage applied to the voltage-controlled oscillator. This is a fourth embodiment of a piezoactuator drive circuit provided by the present invention.

In a further preferred embodiment the frequency control unit comprises memory and means for storing to the memory the voltage level of the frequency control voltage when the frequency of the drive voltage signal is controlled to maximize the phase difference; and the frequency control unit determines the initial frequency control voltage based on the voltage level stored to memory when starting drive voltage signal frequency control by increasing or decreasing the frequency control voltage. This is a fifth embodiment of a piezoactuator drive circuit provided by the present invention.

In another preferred embodiment the frequency control unit applies drive voltage signal frequency control so that the phase difference goes to a reference phase difference. This is a sixth embodiment of a piezoactuator drive circuit provided by the present invention.

The frequency control unit in this case comprises a phase difference detection circuit for detecting, for example, a phase difference between an electrical signal representing oscillation in the first oscillation mode and an electrical signal representing oscillation in the second oscillation mode; a comparison circuit for comparing the phase difference detected by the phase difference detection circuit and the reference phase difference; and a frequency adjusting circuit for increasing or decreasing the drive voltage signal frequency according to the comparison result of the comparison circuit. This is a seventh embodiment of a piezoactuator drive circuit provided by the present invention.

In a preferred embodiment the frequency control unit further comprises a voltage-controlled oscillator for supplying an output signal to the driver; and the frequency adjusting circuit is comprised of a voltage adjusting circuit for increasing or decreasing the frequency control voltage applied to the voltage-controlled oscillator based on the comparison result of the comparison circuit. This is an eighth embodiment of a piezoactuator drive circuit provided by the present invention.

Furthermore, in a preferred embodiment the frequency control unit comprises a drive pass/fail evaluation means for determining if piezoactuator drive succeeded or failed; and an initial reference phase difference adjusting means for reducing the reference phase difference until successful when piezoactuator drive fails, and increasing the reference phase difference when successful. This is a ninth embodiment of a piezoactuator drive circuit provided by the present invention.

The initial reference phase difference adjusting means may omit for a specified period the process for increasing the reference phase difference when the reference phase difference at which piezoactuator drive succeeds is the same for a specific consecutive number of times. This is a tenth embodiment of a piezoactuator drive circuit provided by the present invention.

In a preferred embodiment the frequency control unit has a frequency counter for measuring the frequency of the drive voltage signal; and the drive pass/fail evaluation means determines if piezoactuator drive succeeded or failed based on whether the frequency measurement of the frequency counter is within an appropriate range or not. This is an eleventh embodiment of a piezoactuator drive circuit provided by the present invention.

In a preferred embodiment the frequency control unit comprises means for obtaining, each time the piezoactuator is driven, change from a previous drive operation in the phase difference between an electrical signal from the diaphragm representing oscillation in the first oscillation mode and an electrical signal representing oscillation in the second oscillation mode; and means for increasing or decreasing the reference phase difference according to change in the phase difference. This is a twelfth embodiment of a piezoactuator drive circuit provided by the present invention.

This invention also provides in a control method for a drive circuit having a driver for applying a drive voltage signal that is an ac signal to a diaphragm of a piezoactuator, a voltage-controlled oscillator for outputting a drive voltage signal of a frequency corresponding to a frequency control voltage to the driver, and a phase difference detection circuit for receiving an electrical signal from the diaphragm representing oscillation in a first oscillation mode and an electrical signal representing oscillation in a second oscillation mode with an oscillation direction different from the first oscillation mode, and detecting a phase difference of these electrical signals, a piezoactuator drive circuit control method characterized by comprising: a frequency control step for optimizing the oscillation frequency of the voltage-controlled oscillator based on the phase difference detected by the phase difference detection circuit.

In a preferred embodiment the frequency control step has a step for increasing the oscillation frequency of the voltage-controlled oscillator if the time derivative of the phase difference detected by the phase difference detection circuit is positive, and decreasing if negative, until change in the phase difference over time is within a specific range.

In a separate preferred embodiment the frequency control step has a step for increasing the oscillation frequency of the voltage-controlled oscillator until the phase difference is greater than or equal to a reference phase difference.

In this embodiment a step for determining if driving the piezoactuator succeeded or failed, and correcting the reference phase difference based on the result, may also be provided.

In addition to modes in which products comprising the above-described drive circuit are manufactured or sold, the present invention can also be achieved by modes such as distributing a program for executing the above-described methods to users via an electrical communication circuit, or distributing a computer-readable storage medium storing such a program to users.

From yet a further perspective, this invention provides a piezoactuator characterized by comprising: a diaphragm of which piezoelectric elements are major components for oscillating when an ac signal is applied in a first oscillation mode and a second oscillation mode having a different oscillation direction; a first oscillation detection electrode disposed on a surface of the diaphragm to detect oscillation in the first oscillation mode; and a second oscillation detection electrode disposed on a surface of the diaphragm to detect oscillation in the second oscillation mode.

In a preferred embodiment the first oscillation mode is a longitudinal oscillation mode, and the second oscillation mode is a sinusoidal oscillation mode.

In a preferred embodiment the piezoactuator has a contact part that is a member for contacting the rotor of a drive mechanism, moving in an elliptical path described by oscillation in the longitudinal oscillation mode and oscillation in the sinusoidal oscillation mode produced in the diaphragm, and rotationally driving the rotor.

From yet another perspective, the present invention provides a portable electronic device characterized by comprising a piezoactuator and a drive circuit, the piezoactuator having as a major component a diaphragm made from piezoelectric elements and oscillating when an ac signal is applied in a first oscillation mode and oscillating in a second oscillation mode having a different oscillation direction; and the drive circuit having a driver for applying a drive voltage signal that is an ac signal to the diaphragm, and a frequency control unit for detecting an electrical signal from the diaphragm representing oscillation in the first oscillation mode and an electrical signal representing oscillation in the second oscillation mode, and applying frequency control of the drive voltage signal to optimize the phase difference between these signals.

This portable electronic device uses any one of the above-described twelve embodiments as the drive circuit, but can use the second to twelfth embodiments.

In a preferred embodiment the portable electronic device is a wristwatch comprising a rotor rotationally driven by the piezoactuator; and a display mechanism linked to the rotor for displaying information related to time.

In a separate preferred embodiment the portable electronic device is a contactless IC card.

BEST MODE FOR ACHIEVING THE INVENTION

Preferred embodiments of the present invention are described below with reference to the accompanying figures.

[1] Embodiment 1

[1.1] Overall Configuration

Figure 1:
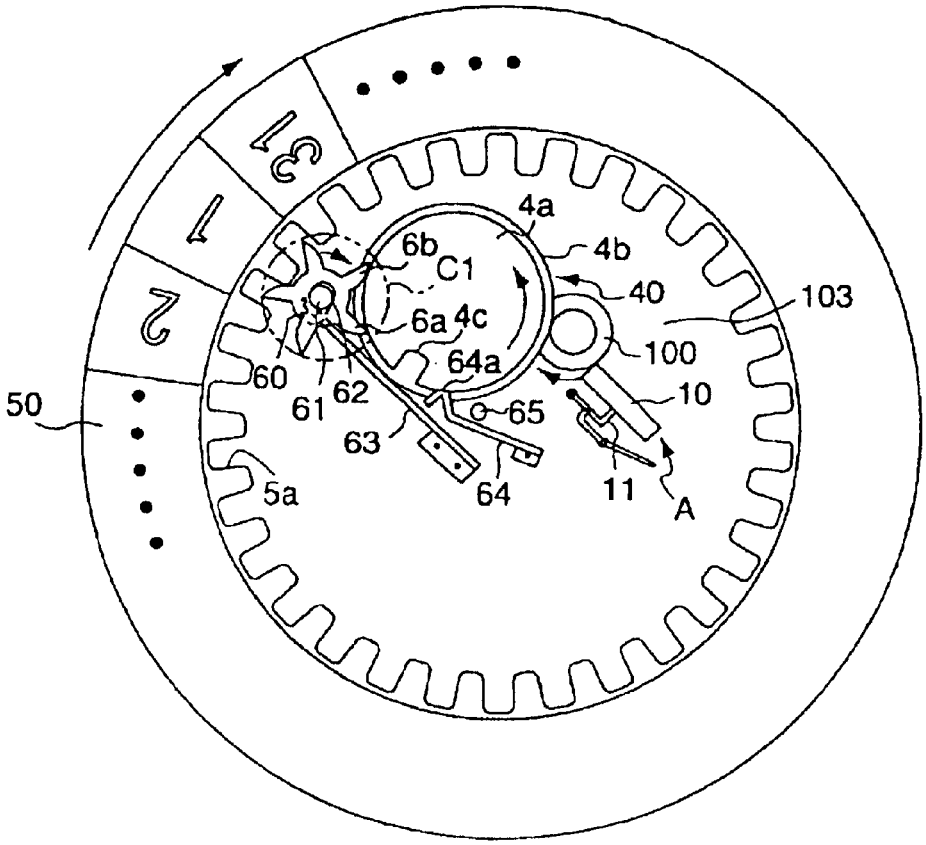
FIG. 1 is a plan view showing the configuration of the major parts of a wristwatch calendar display mechanism having assembled therein a piezoactuator according to a first embodiment of this invention.

FIG. 1 is a plan view showing the configuration of a wristwatch calendar display mechanism in which a piezoactuator A according to a first embodiment of this invention is assembled.

As shown in FIG. 1, the main part of the calendar display mechanism is substantially configured with a piezoactuator A according to the present embodiment, rotor 100 rotationally driven by this piezoactuator A, a speed-reducing wheel train for speed reducing and transferring rotation of the rotor 100, and a date counter 50 rotated by drive force transferred through the speed-reducing wheel train. The speed-reducing wheel train includes a date-turning middle wheel 40 and date-turning wheel 60. The piezoactuator A has a flat rectangular diaphragm 10; this diaphragm 10 is disposed with the end thereof in contact with the outside surface of the rotor 100.

Figure 2:
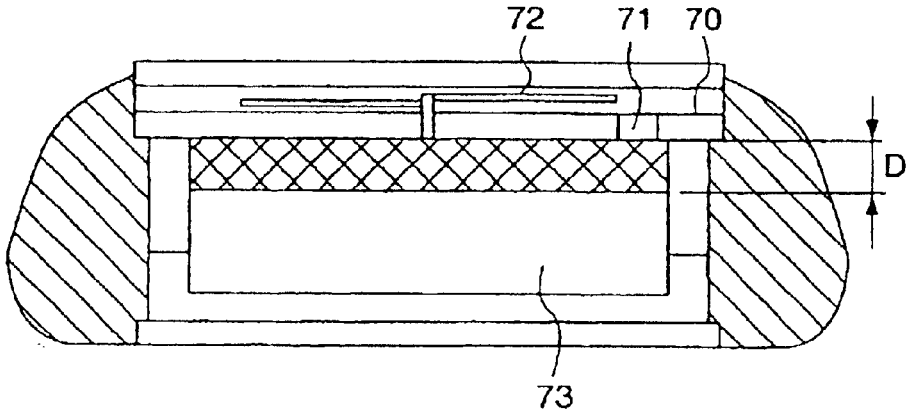
FIG. 2 is a section view showing the basic configuration of the same wristwatch.

FIG. 2 is a section view of the watch shown in FIG. 1. The calendar display mechanism comprising the piezoactuator A is assembled at the hatched part in the figure. A disc-shaped dial 70 is disposed above this calendar display mechanism. A window 71 for displaying the date is disposed at one part at the outside of the dial 70 so that the date on the date counter 50 can be seen through the window 71. The movement and drive circuit (not shown in the figure) for driving the hands 72 is disposed below the dial 70.

Figure 3:
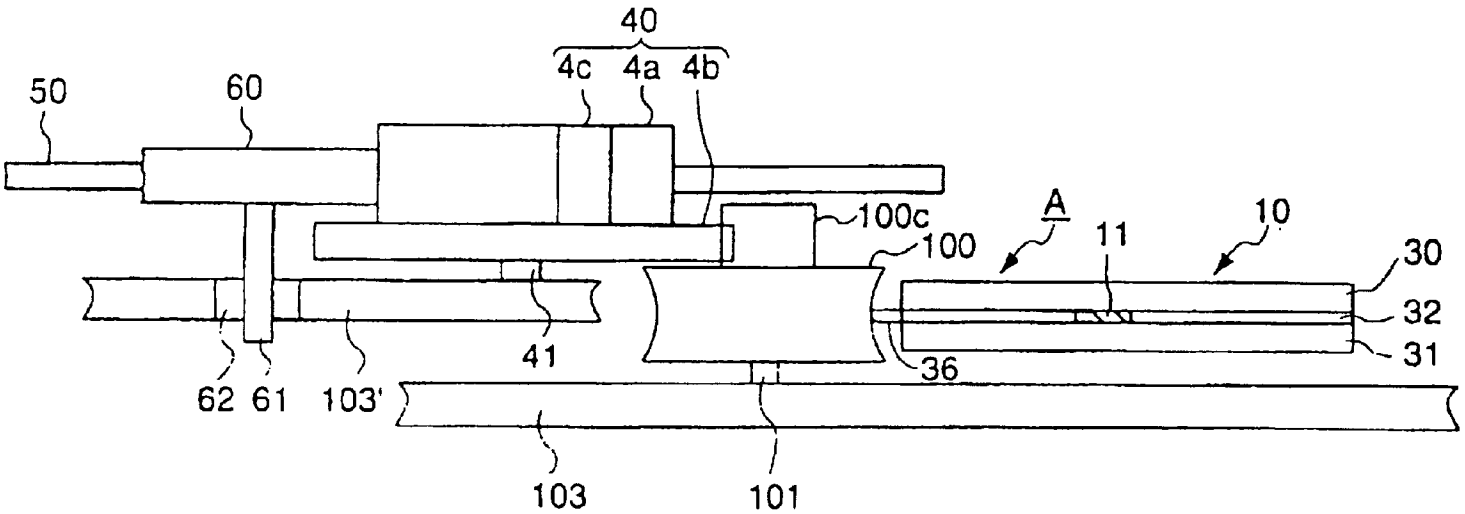
FIG. 3 is a section view showing the basic configuration of the same calendar display mechanism.

FIG. 3 is a section view showing the detailed configuration of the calendar display mechanism shown in FIG. 1. As shown in FIG. 3 the watch has a base plate 103 that is a first bottom plate, and a second bottom plate 103' on a different level than the base plate 103. A shaft 101 axially supporting the rotor 100 of the calendar display mechanism projects from the base plate 103. The rotor 100 has a bearing (not shown in the figure) on its bottom, and the end of the shaft 101 is held in the bearing. A gear 100c that is coaxial to the rotor 100 and turns in conjunction with the rotor 100 is disposed at the top of the rotor 100.

A shaft 41 for axially supporting the date-turning middle wheel 40 projects from the base plate 103'. A bearing (not shown in the figure) is disposed to the bottom of the date-turning middle wheel 40, and the end of the shaft 41 is held in the bearing. The date-turning middle wheel 40 has a large diameter part 4b and a small diameter part 4a. The small diameter part 4a is cylindrical with a slightly smaller diameter than the large diameter part 4b, and has a substantially square notch 4c formed in its outside surface. This small diameter part 4a is affixed to the large diameter part 4b so that they are concentric. The top gear 100c of the rotor 100 meshes with the large diameter part 4b. Therefore, the date-turning middle wheel 40 having large diameter part 4b and small diameter part 4a rotates in conjunction with rotation of the rotor 100 on shaft 41 as the axis of rotation.

The date counter 50 is ring shaped as shown in FIG. 1, and has internal gear 5a formed on the inside circumference surface. The date-turning wheel 60 has a five tooth gear and meshes with internal gear 5a. As shown in FIG. 3, a shaft 61 is disposed in the center of the date-turning wheel 60, and is fit with play in a through-hole 62 formed in the base plate 103'. The through-hole 62 is formed oblongly in the circumferential direction of the date counter 50.

One end of leaf spring 63 is fixed to base plate 103' and the other end flexibly presses up and to the right as seen in FIG. 1 on shaft 61. Leaf spring 63 urges shaft 61 and date-turning wheel 60. The urging action of this leaf spring 63 also prevents rocking of date counter 50.

One end of leaf spring 64 is screw fixed to the second bottom plate 103', and an end part 64a bent substantially in a V-shape is formed on the other end. Contact 65 is placed so as to contact leaf spring 64 when date-turning middle wheel 40 turns and end part 64a enters notch 4c. A specific voltage is applied to the leaf spring 64, and when it contacts contact 65 the voltage is also applied to the contact 65. It is therefore possible to detect the date counting status by detecting the voltage of contact 65. It should be noted that a manual drive gear engaging internal gear 5a is also preferably provided so that the date counter 50 can be driven when a user performs a specific action with the crown (not shown in the figure).

When a drive voltage is applied from a drive circuit in the configuration described above, the diaphragm 10 of the piezoactuator A oscillates within the plane thereof including the surfaces. The outside surface of the rotor 100 is struck by the oscillations produced in this diaphragm 10, and the rotor 100 is rotationally driven clockwise as indicated by the arrow in the figure. This rotation of the rotor 100 is transferred through date-turning middle wheel 40 to the date-turning wheel 60, and this date-turning wheel 60 turns the date counter 50 clockwise.

It will be noted here that power transfer from the diaphragm 10 to the rotor 100, from the rotor 100 to the speed-reducing wheel train, and from the speed-reducing wheel train to the date counter 50 is in each case the transfer of power in the direction parallel to the surfaces of the diaphragm 10. It is therefore possible to dispose the diaphragm 10 and rotor 100 in the same plane, rather than stacking a coil and rotor in the thickness direction as with a stepping motor according to the related art, and the calendar display mechanism can therefore be made thinner. Furthermore, by making the calendar display mechanism thin it is also possible to reduce the thickness D of the hatched part and make the overall watch thinner.

Furthermore, because it is possible with the present invention to house the calendar display mechanism in the hatched area in FIG. 2, a common movement 73 can be used in watches that have a calendar display mechanism and watches that do not have a calendar display mechanism, and productivity can be increased.

Various wristwatches with an electrical generator function have been proposed recently, and reducing overall watch size has been difficult with this type of wristwatch because two large mechanical elements must be provided, the generating mechanism and a motor mechanism for the movement. However, by using a piezoactuator A according to the present embodiment of the invention in place of a motor, a thin movement can be provided and overall watch size can be reduced.

[1.2] Details of the Piezoactuator According to the Embodiment

Figure 4:
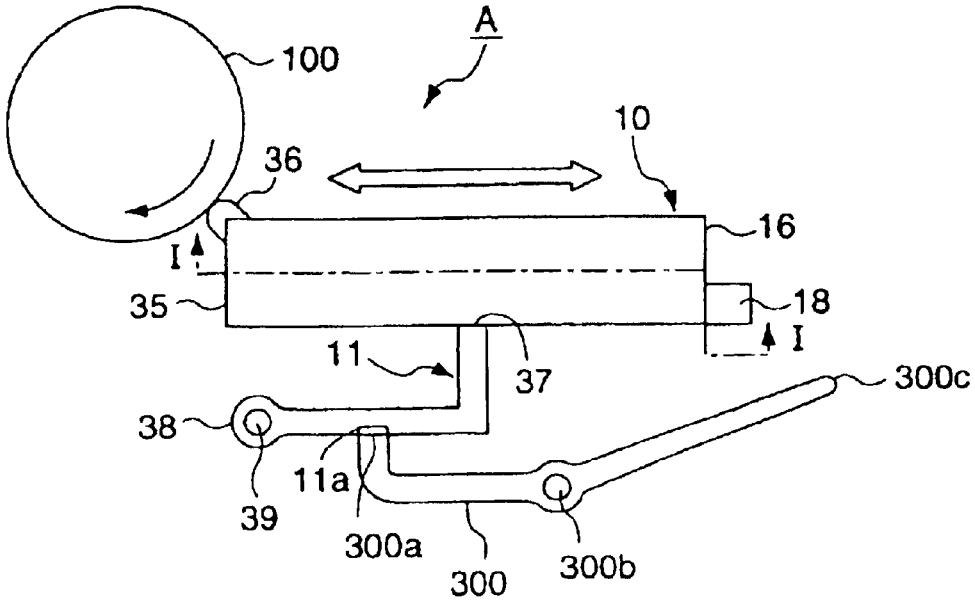
FIG. 4 is a plan view showing the detailed configuration of the same piezoactuator.
Figure 5:
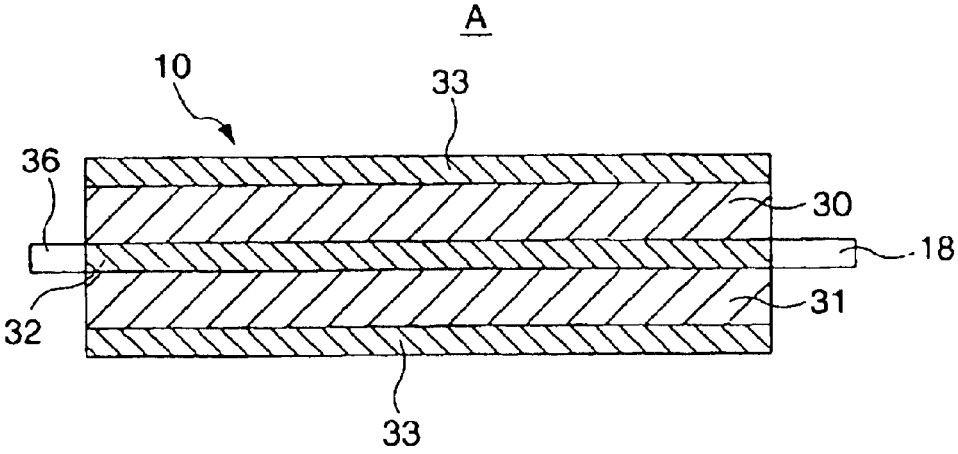
FIG. 5 is a section view showing the configuration of the diaphragm of the same piezoactuator.

FIG. 4 is a plan view showing the detailed configuration of the piezoactuator A. FIG. 5 is a section view through I–I' of the diaphragm 10 in the piezoactuator A. As shown in FIG. 4 the diaphragm 10 is a rectangular plate enclosed by two long sides and two short sides. As shown in FIG. 5, the diaphragm 10 has a lamellar structure with two rectangular flat piezoelectric elements 30 and 31 and disposed therebetween a stainless steel reinforcing plate 32 of substantially the same shape as the piezoelectric elements 30 and 31 and thinner than the piezoelectric elements 30 and 31.

By thus disposing a reinforcing plate 32 between piezoelectric elements 30 and 31 damage to the diaphragm 10 caused by excessive amplitude in the diaphragm 10 or external shock from dropping, for example, is reduced and durability can be improved. Furthermore, by using a part thinner than the piezoelectric elements 30 and 31 for the reinforcing plate 32, interference with oscillation of the piezoelectric elements 30 and 31 can be significantly avoided.

The piezoelectric elements 30 and 31 can be made from materials such as lead zirconate titanate (PZT (TM)), quartz, lithium niobate, barium titanate, lead titanate, lead metaniobate, polyvinylidene fluoride, zinc lead niobate, and scandium lead niobate. The chemical formula for zinc lead niobate is [Pb(Zn1/3-Nb2/3)3)1—X (PbTiO3)X] (where X differs according to the composition, and X=0.09 approximately), and the chemical formula for scandium lead niobate is [{Pb((Sc1/2-Nb1/2)1—X TiX O3] (where X differs according to the composition, and X=0.09 approximately).

As shown in FIG. 4, the diaphragm 10 has a contact 36 at one corner where a long side and a short side intersect. This contact 36 is achieved by cutting or otherwise shaping the reinforcing plate 32 shown in FIG. 5, causing an end part with a gradually rounded surface to project from the piezoelectric elements 30 and 31. The diaphragm 10 is positioned with the tip of this contact 36 contacting the outside surface of the rotor 100 and the long sides thereof held at an angle of approximately 135 degrees to the radius of the rotor 100. A support member 11 and spring 300 are disposed to the piezoactuator A in order to hold the diaphragm 10 in this position.

In a preferred embodiment the support member 11 is formed integrally to the reinforcing plate 32 by cutting or otherwise shaping the reinforcing plate 32. As shown in the figure this support member 11 is an L-shaped member having a perpendicular part projecting perpendicularly from substantially the center of the long side of the diaphragm 10, and a horizontal part projecting from the end of this perpendicular part parallel to the long side toward the rotor 100. A pin 39 protruding from the base plate 103 as shown in FIG. 1 and FIG. 3 passes through end 38 on the opposite end of the horizontal part from the perpendicular part. The support member 11 and diaphragm 10 fixed thereto can turn on this pin 39 as the axis of rotation.

End 300a of spring 300 is engaged with approximately the center part 11a of the horizontal part of the support member 11. A pin 300b protruding from the base plate 103 (see FIG. 1 and FIG. 3) passes through substantially the center of the spring 300. The spring 300 can rotate on this pin 300b as the axis of rotation. The other end part 300c of the spring 300 on the end opposite end 300a engages the base plate 103. The pressure with which the contact 36 pushes against the outside surface of the rotor 100 can be adjusted in this embodiment by changing the position of this end 300c.

More specifically, if end 300c is displaced clockwise as seen in the figure around pin 300b, the force with which end 300a of spring 300 pushes up on part 11a of support member 11 increases, and this force decreases if end 300c is displaced counterclockwise. If the force pushing up on the support member 11 increases, the force causing the support member 11 to rotate counterclockwise about pin 39 increases, and the force whereby the contact 36 pushes the rotor 100 increases. On the other hand, if the force pushing the support member 11 up decreases, the force causing support member 11 to rotate clockwise decreases, and the force of contact 36 against the rotor 100 decreases. The drive characteristics of the piezoactuator A can thus be adjusted by the pressure applied by contact 36 against rotor 100.

It will be noted that in this embodiment the contact 36 pushing against the outside surface of the rotor 100 is curved. As a result, contact between the outside surface of the rotor 100, which is a curved surface, and the curved contact 36 will not change appreciably even if the relative positions of the rotor 100 and diaphragm 10 vary due to dimensional variations, for example. It is therefore possible to maintain stable contact between the rotor 100 and contact 36. Furthermore, grinding or polishing only needs to be applied to the contact 36 that contacts the rotor 100 in this embodiment, and managing the contact with the rotor 100 is therefore simple. A conductor or non-conductor can be used for the contact 36, but shorting of the piezoelectric elements 30 and 31 can be prevented when there is contact with the rotor 100, which is generally made of metal, if a non-conductor is used.

[1.3] Configuration of the Drive Circuit and Electrodes Disposed on the Diaphragm The drive electrode and oscillation detection electrodes disposed to the diaphragm 10 are described next with reference to FIG. 6. In the example shown in FIG. 6 rectangular oscillation detection electrodes T1, T2, T3, and T4 are positioned at the four corners on the surface of the rectangular piezoelectric element 30. Although not shown in FIG. 6, oscillation detection electrodes T1, T2, T3, and T4 identical to these are also located on the opposite side at the corners of piezoelectric element 31. Oscillation detection electrode T1 located on piezoelectric element 30 and oscillation detection electrode T1 located on piezoelectric element 31 are connected, and detection signal SD1 representing oscillation of the diaphragm 10 is obtained from a contact therebetween. Oscillation detection electrode T2 located on piezoelectric element 30 and oscillation detection electrode T2 located on piezoelectric element 31 are likewise connected, and detection signal SD2 representing oscillation of the diaphragm 10 is obtained from a contact therebetween. The other oscillation detection electrodes T3 and T4 are the same. Drive electrode 33 is disposed on the surface of piezoelectric element 30 in the area not covered by oscillation detection electrodes T1 to T4. There is a gap between the drive electrode 33 and oscillation detection electrodes T1 to T4, which are thus electrically isolated. An identical drive electrode 33 is also disposed to the surface of piezoelectric element 31.

Figure 7:
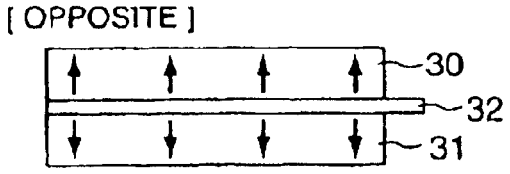
FIG. 7 and FIG. 8 show polarization states of the same piezoelectric device.
Figure 8:
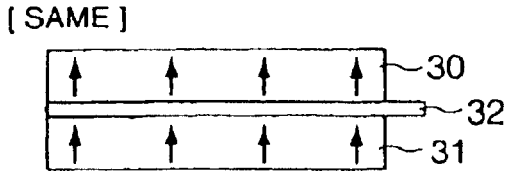

Piezoelectric elements 30 and 31 are each polarized in the thickness direction. FIG. 7 and FIG. 8 each show examples of the polarization states of piezoelectric elements 30 and 31. In this embodiment of the invention piezoelectric elements 30 and 31 have the property of expanding in the longitudinal direction when a field in the same direction as each direction of polarization is received and contracting when a field in the direction opposite the polarization direction is received. Therefore, when the arrangement of the polarization directions of the two piezoelectric elements 30 and 31 is different as shown in FIG. 7 and FIG. 8, the method of driving each piezoelectric element is also different.

In the example shown in FIG. 7 piezoelectric elements 30 and 31 are polarized in mutually opposite directions. In this case, as shown in FIG. 6, the reinforcing plate 32 is to ground, the drive electrode 33 on piezoelectric element 30 and the drive electrode 33 on piezoelectric element 31 are connected, and a drive voltage signal SDR of a specific frequency alternating between a +V voltage and −V voltage is repeatedly applied between this contact and the ground line. When a +V voltage is applied between the ground line and the contact between the two drive electrodes 33, a field opposite each polarization direction is applied to piezoelectric elements 30 and 31, and piezoelectric elements 30 and 31 therefore contract longitudinally. On the other hand, when a −V voltage is applied between the ground line and the contact between the two drive electrodes 33, a field in the same direction as each polarization direction is applied to piezoelectric elements 30 and 31, and piezoelectric elements 30 and 31 therefore expand longitudinally. Because of this behavior the diaphragm 10 expands and contracts in the longitudinal direction as a result of applying a drive voltage signal SDR of a specific frequency. This expansion and contraction movement is called longitudinal oscillation or oscillation in a first oscillation mode.

In the example shown in FIG. 8 the piezoelectric elements 30 and 31 are polarized in the same direction. In this case the reinforcing plate 32 is to ground and a first phase, in which a +V voltage is applied between the ground line and drive electrode 33 on piezoelectric element 30 and a −V voltage is applied between the ground line and drive electrode 33 on piezoelectric element 31, and a second phase, in which a −V voltage is applied between the ground line and drive electrode 33 of piezoelectric element 30 and a +V voltage is applied between the ground line and drive electrode 33 on piezoelectric element 31, are repeated at a specific frequency. In this first phase the piezoelectric elements 30 and 31 contract longitudinally because a field in the direction opposite each polarization direction is applied to piezoelectric elements 30 and 31. In the second phase, on the other hand, the piezoelectric elements 30 and 31 expand longitudinally because a field of the same direction as each polarization direction is applied to piezoelectric elements 30 and 31. Longitudinal oscillation is thus produced in the diaphragm 10 by applying such drive voltages of a specific frequency.

Figure 9:
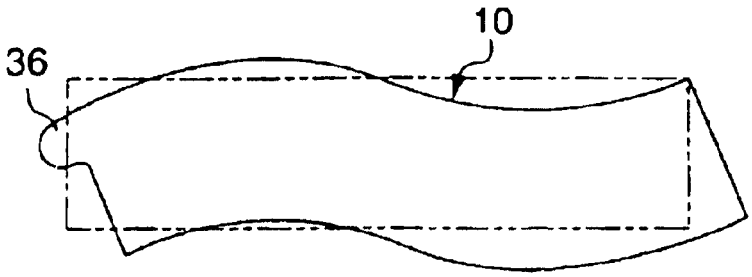
FIG. 9 shows sinusoidal oscillation produced in the diaphragm.
Figure 10:
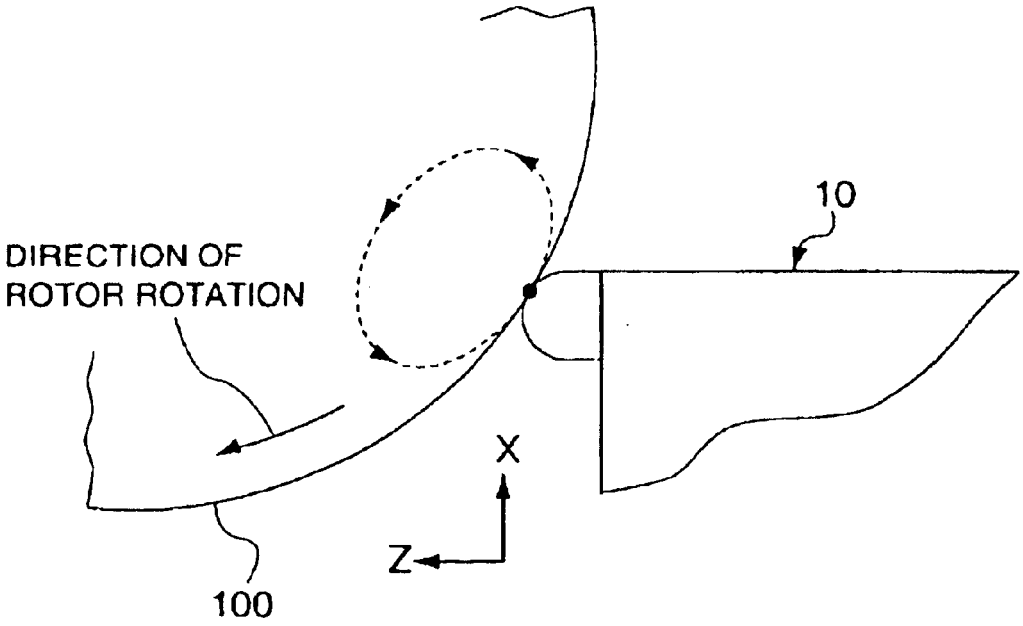
FIG. 10 shows the elliptical motion produced in the end contact part of the diaphragm.

It should be noted that the diaphragm 10 can be made substantially linearly symmetrical about an axis of symmetry passing through the center in the longitudinal direction, but is not completely symmetrical because of such asymmetrical components contained therein as contact 36. As a result, when longitudinal oscillation is produced in the diaphragm 10, a moment swinging in the direction perpendicular to the longitudinal direction of the diaphragm 10 occurs at a delay to this longitudinal oscillation. This moment produces sinusoidal oscillation in the diaphragm 10. As shown in FIG. 9. This sinusoidal oscillation is movement in which the diaphragm 10 moves in the plane including the surfaces of the diaphragm 10 perpendicularly to the longitudinal direction. When such longitudinal oscillation and sinusoidal oscillation is produced in the diaphragm 10, the contact 36 at the end of diaphragm 10 moves in an elliptical pattern as shown in FIG. 10. The rotor 100 is thus struck on the outside surface by contact 36 moving in this elliptical path, and is thus rotationally driven.

The amplitude of the longitudinal oscillation and the amplitude of the sinusoidal oscillation differs according to the position on the surface of the diaphragm 10. That is, a phenomenon occurs in which longitudinal oscillation is conspicuous at certain positions on the surface and sinusoidal oscillation is conspicuous at other positions. The diaphragm 10 also has a resonance characteristic to the longitudinal oscillation and a resonance characteristic to the sinusoidal oscillation. Resonance with respect to longitudinal oscillation of the diaphragm 10 and resonance with respect to sinusoidal oscillation is determined by the shape and material of the diaphragm 10, but the latter resonance frequency is slightly higher than the former resonance frequency.

In this preferred embodiment oscillation detection electrode pairs are disposed at plural locations on the piezoelectric elements 30 and 31 of diaphragm 10, and longitudinal oscillation and sinusoidal oscillation are thereby detected. FIG. 11 to FIG. 14 show the voltage amplitude of the detection signals from each of the oscillation detection electrodes T1 to T4 when the frequency of the drive voltage signal SDR applied to drive electrode 33 is changed when a load is not connected to the diaphragm 10.

Figure 6:
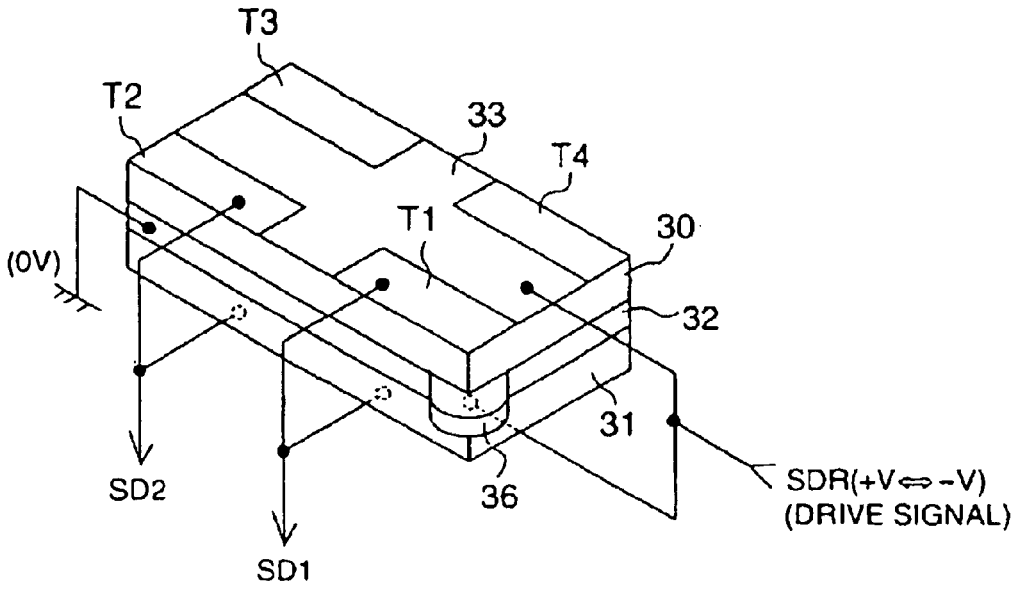
FIG. 6 shows an example of electrodes formed on the surface of the piezoelectric device in the same piezoactuator.
Figure 11:
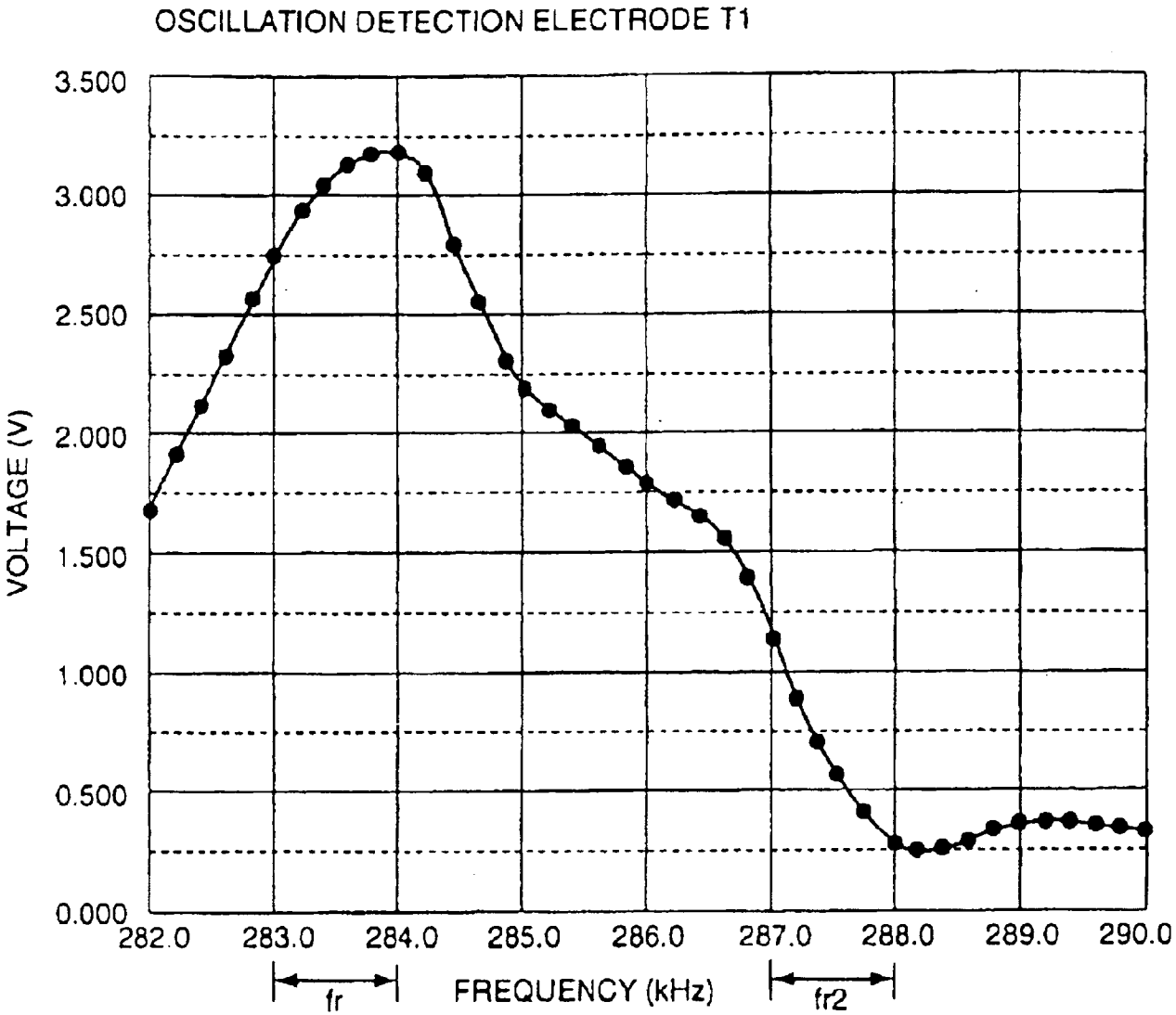
FIG. 11 to FIG. 14 show change to the drive frequency of detection signals obtained from the oscillation detection electrodes of the diaphragm.
Figure 12:
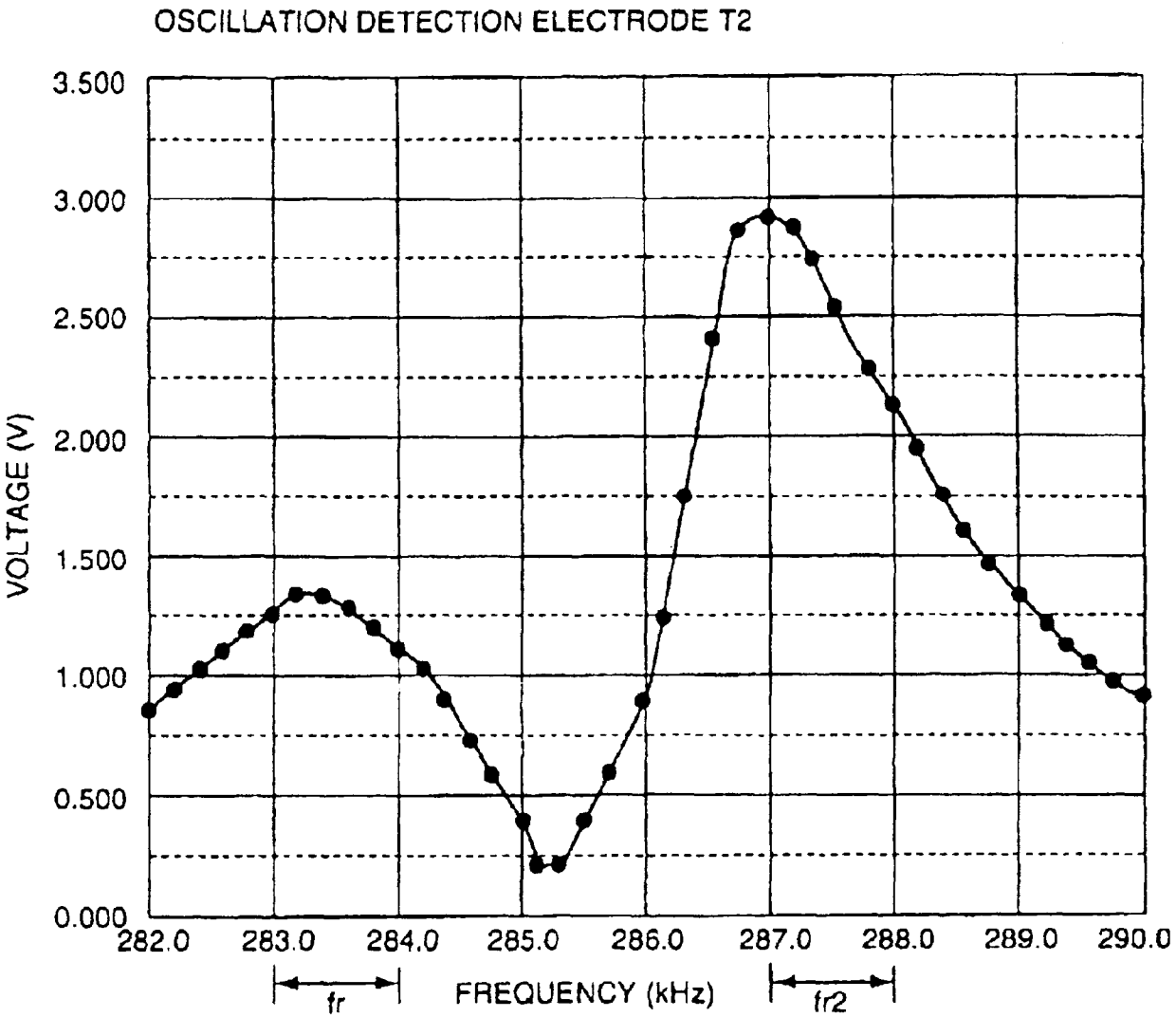
Figure 13:
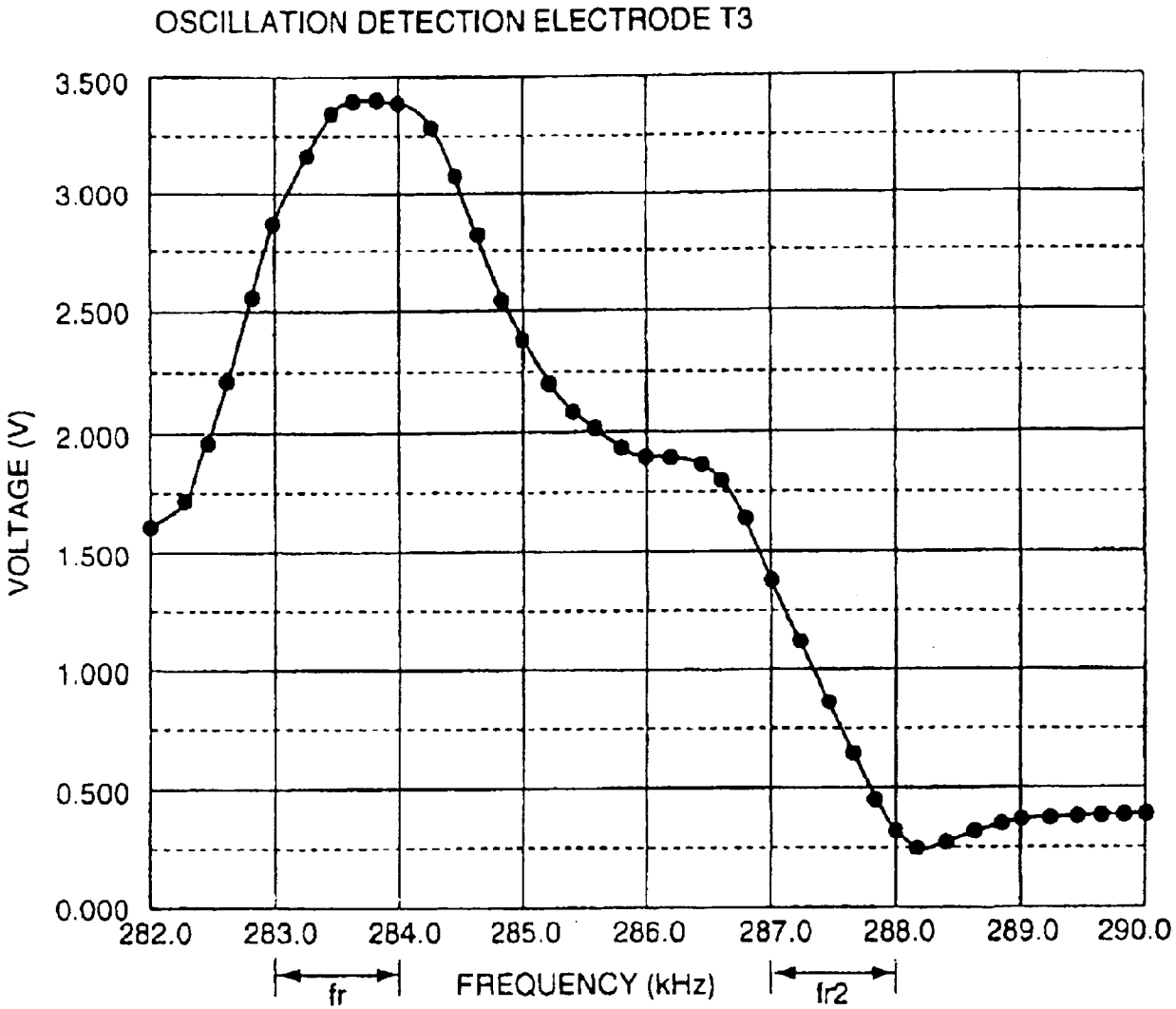
Figure 14:
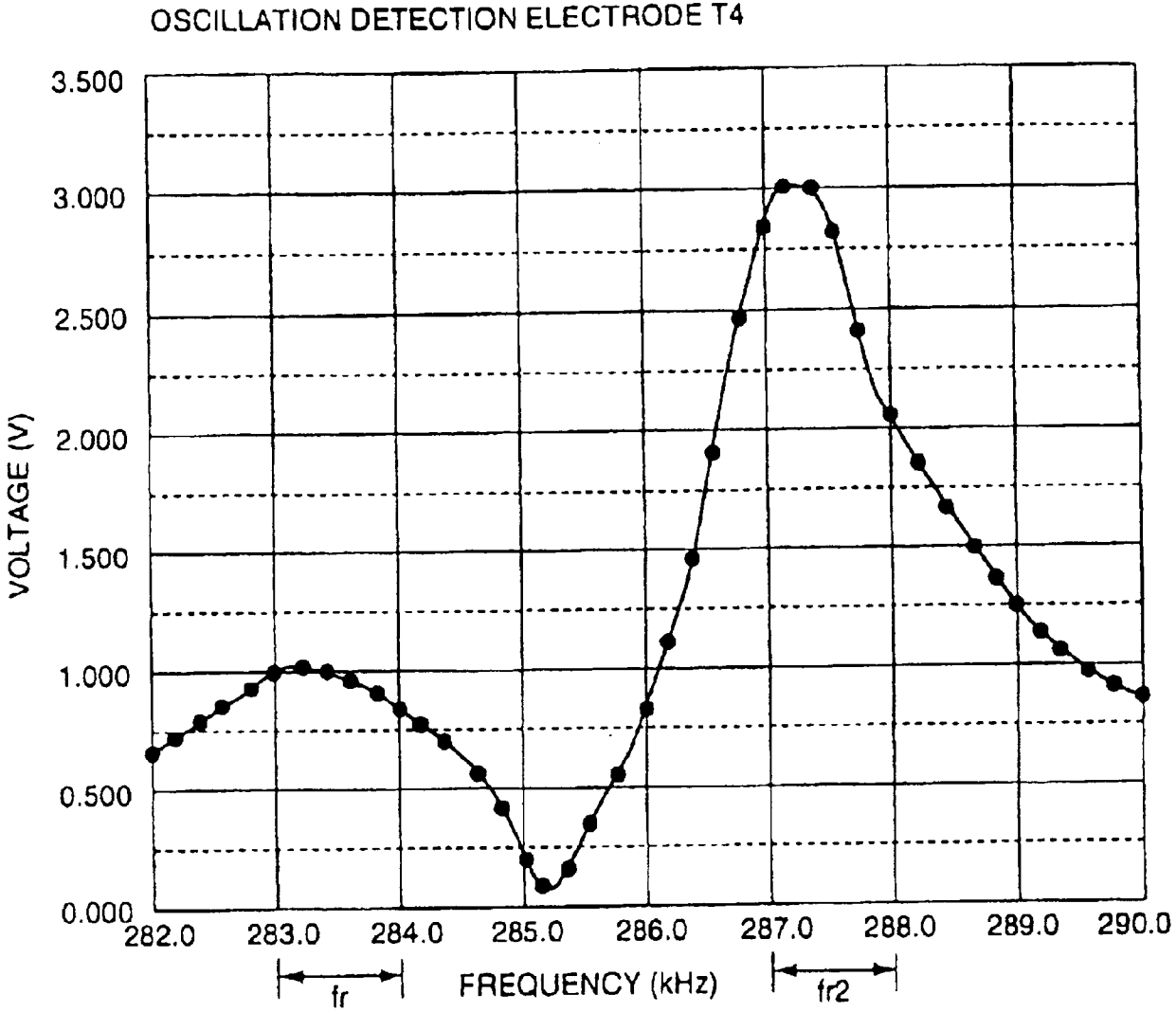

Referring to FIG. 6, oscillation detection electrodes T1 and T3 are disposed to positions where longitudinal oscillation of the diaphragm 10 is conspicuous. As a result, as shown in FIG. 11 and FIG. 13, the amplitude voltage of the detection signals obtained from these electrodes is greatest near the resonance frequency band fr (approximately 283.5 [kHz]) related to longitudinal oscillation of the diaphragm 10. On the other hand, oscillation detection electrodes T2 and T4 are disposed to positions where sinusoidal oscillation of the diaphragm 10 is conspicuous. As a result, as shown in FIG. 12 and FIG. 14, the amplitude voltage of the detection signals obtained from these electrodes is greatest near the resonance frequency band fr2 (approximately 287.5 [kHz]) related to sinusoidal oscillation of the diaphragm 10. This tendency is the same when a load is connected to the diaphragm 10.

Figure 15:
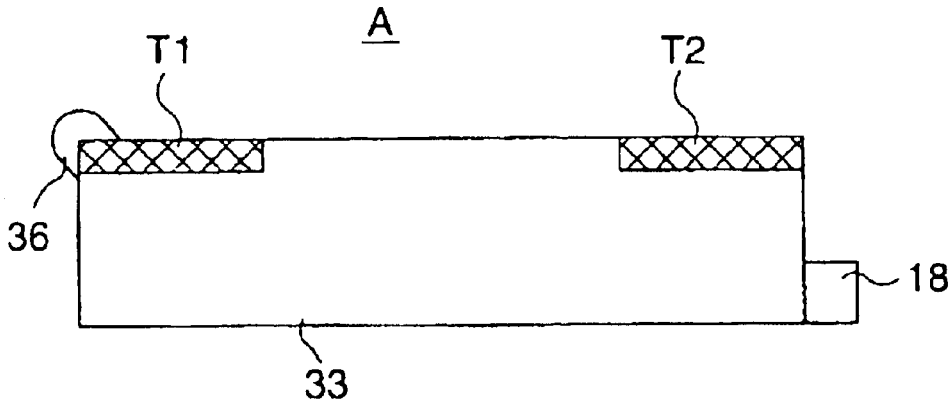
FIG. 15 and FIG. 16 show sample arrangements of the oscillation detection electrodes of the diaphragm.
Figure 16:
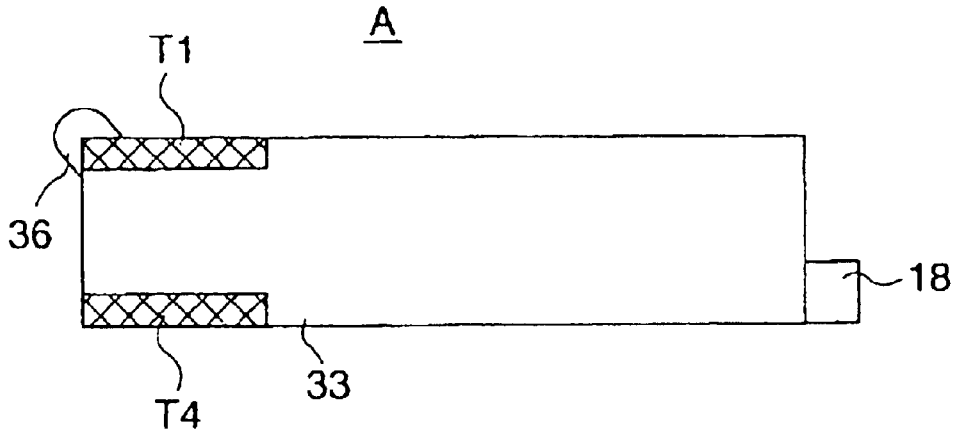

Various methods of arranging the oscillation detection electrodes other than as shown in FIG. 6 are also possible. FIG. 15 and FIG. 16 show examples of these. Only oscillation detection electrodes T1 and T2 shown in FIG. 6 are provided in the example shown in FIG. 15. In the example shown in FIG. 16, only oscillation detection electrodes T1 and T4 shown in FIG. 6 are provided.

Figure 17:
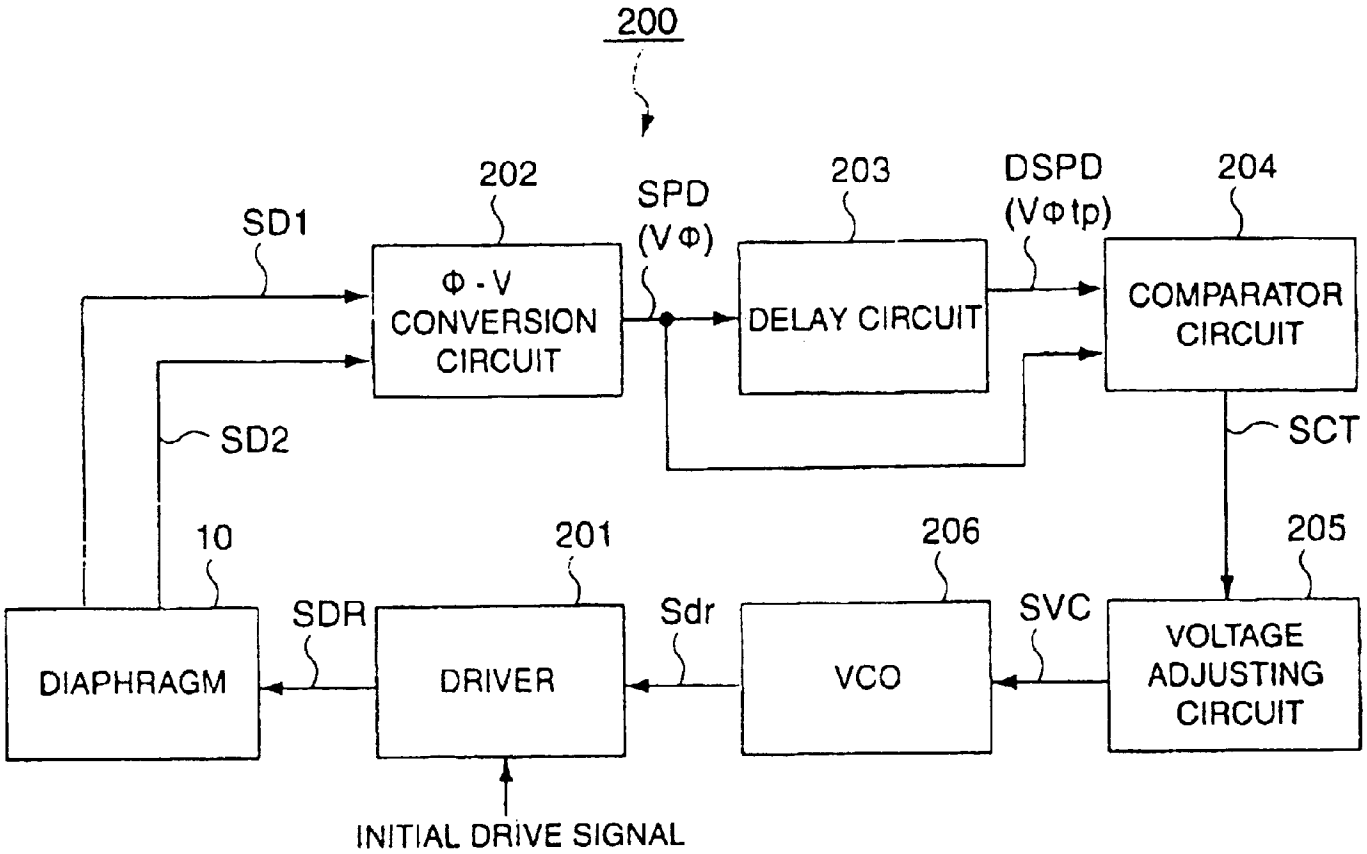
FIG. 17 is a block diagram showing the configuration of a drive circuit for a piezoactuator according to a first embodiment of this invention.

FIG. 17 is a block diagram showing the configuration of the drive circuit 200 supplying drive voltage signal SDR to the drive electrodes 33 of the diaphragm 10 in the present embodiment. This drive circuit 200 has a function for controlling the frequency of drive voltage signal SDR to maintain substantially the greatest phase difference between longitudinal oscillation and sinusoidal oscillation produced in the diaphragm 10. This method of frequency control is used in order to efficiently transfer the kinetic energy of diaphragm 10 to the rotor 100. This is described in detail below.

Figure 18:
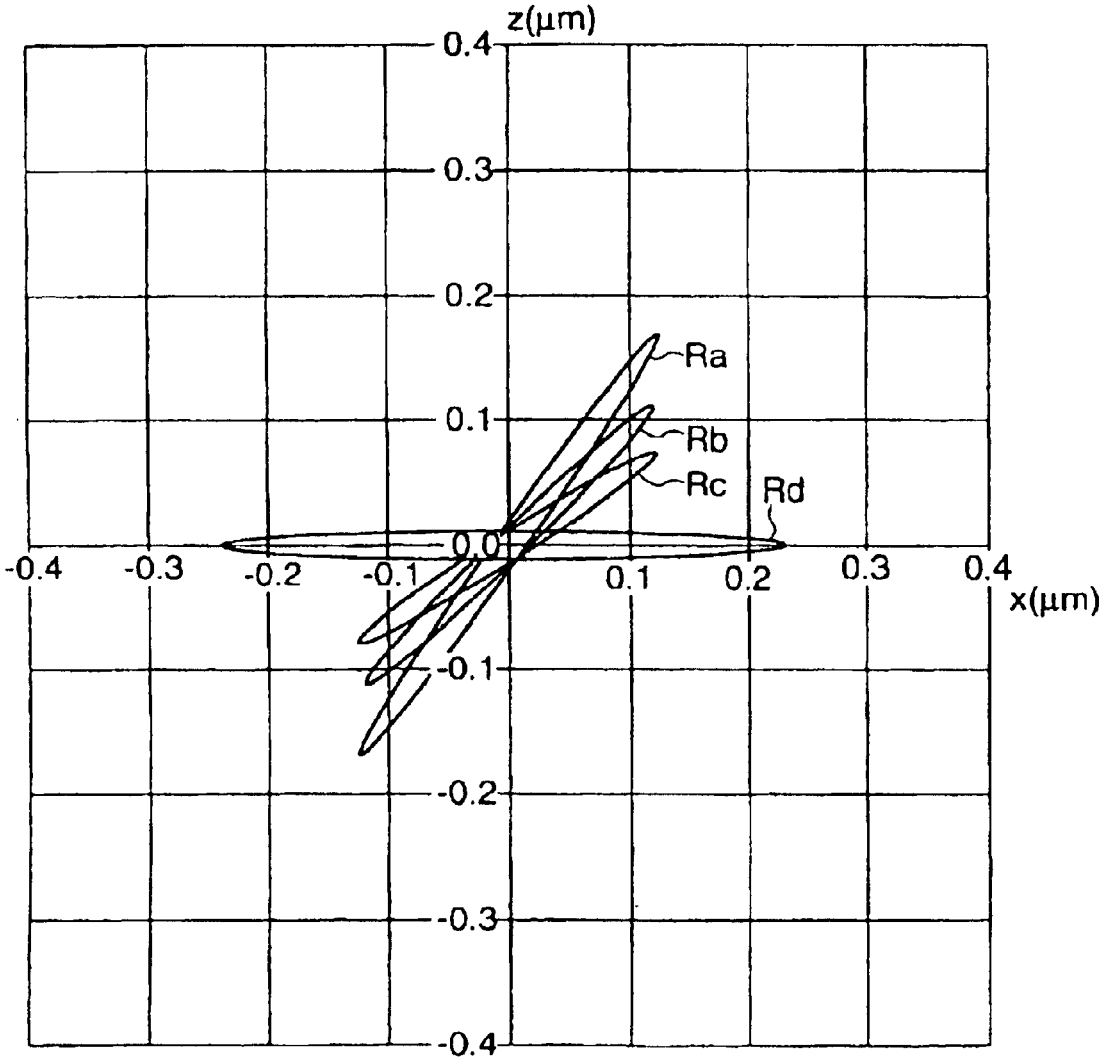
FIG. 18 shows examples of change in the path of the contact part in the present embodiment due to the drive frequency.

FIG. 18 shows an example of the path described by contact 36 of diaphragm 10. Describing the x axis and z axis in the figure, the z axis is the axis for the longitudinal direction of diaphragm 10 as shown in FIG. 10, and the x axis is the axis perpendicular to the z axis in the plane containing the surfaces of the diaphragm 10. In FIG. 18 Ra is the path of contact 36 when the frequency of drive voltage signal SDR matches the resonance frequency fr of longitudinal oscillation, and Rd is the path of contact 36 when the frequency of drive voltage signal SDR matches the resonance frequency fr2 of sinusoidal oscillation. In addition, Rb and Rc denote the path of contact 36 when the frequency of the drive voltage signal SDR is a frequency fb, fc (fb<fc) between fr and fr2.

Because sinusoidal oscillations produced in diaphragm 10 are induced by the longitudinal oscillation, the phase of sinusoidal oscillation is delayed relative to the phase of longitudinal oscillation. The path of contact 36 is an elliptical path with a bulge as shown in FIG. 18 instead of a linear path because there is a phase difference between the longitudinal oscillation and sinusoidal oscillation. This phase difference of the longitudinal oscillation and sinusoidal oscillation depends on the frequency of the drive voltage signal SDR. When the phase difference changes according to frequency, the shape of the elliptical path described by the contact 36 changes, and a change is also thought to occur in the rotational drive force applied to the rotor 100.

As also shown in FIG. 18, the orientation of the long diameter of the elliptical path gradually moves away from the z axis and slopes to an orientation parallel to the x axis as the frequency of the drive voltage signal moves from the resonance frequency fr of longitudinal oscillation to the resonance frequency fr2 of sinusoidal oscillation. When the slope of the elliptical path of contact 36 thus changes due to change in the frequency of the drive voltage signal SDR, the magnitude of the rotational drive force applied to the rotor 100 is also thought to change.

Figure 19:
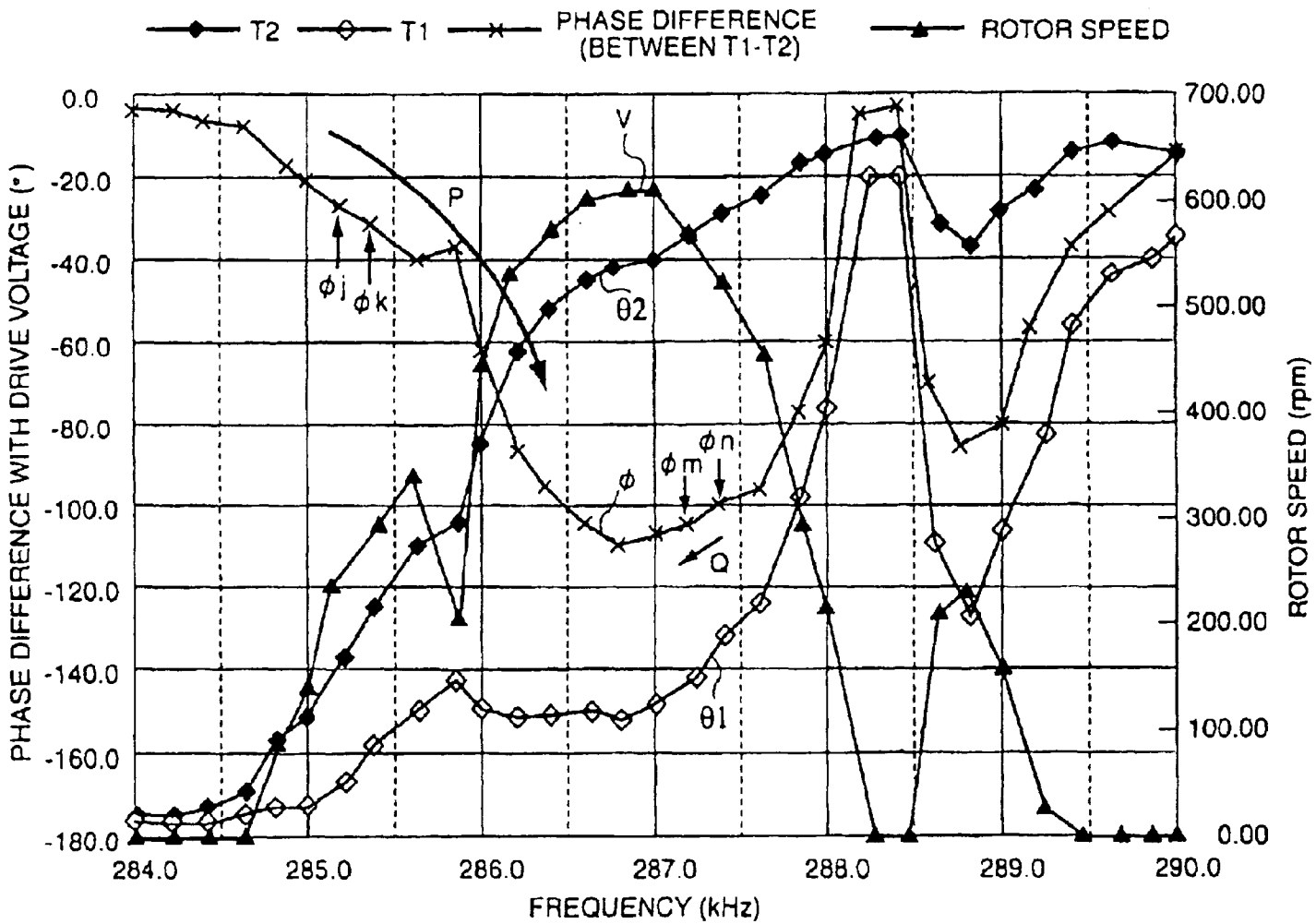
FIG. 19 shows examples of change in the rotational speed of the rotor and change in the phase difference of the longitudinal oscillation and sinusoidal oscillation detection signals in the same embodiment when the frequency of the drive voltage signal applied to the diaphragm varies.

Following the above lines of thought, the inventors investigated the relationship between the frequency of the drive voltage signal SDR and rotation of the rotor 100 in detail. FIG. 19 shows the frequency characteristic of diaphragm 10 obtained as a result of these investigations: the horizontal axis denotes the frequency of the drive signal applied to the drive electrodes of the diaphragm 10, the first vertical axis on the left denotes the phase difference, and the second vertical axis on the right denotes the rotational speed of the rotor 100 driven by contact 36. Graph θ1 denotes the phase difference between the phase of the drive voltage signal SDR applied to drive electrodes 33 and the phase of detection signal SD1 obtained from oscillation detection electrodes T1. Graph θ2 denotes the phase difference between the phase of the drive voltage signal SDR applied to drive elect codes 33 and the phase of detection signal SD2 obtained from oscillation detection electrodes T2. Graph θ denotes ϕ2−θ1, that is, the phase difference between the phase of detection signal SD1 obtained from oscillation detection electrodes T1 and the phase of detection signal SD2 obtained from oscillation detection electrodes T2. This phase difference is equivalent to the phase difference between the phase of longitudinal oscillation and the phase of sinusoidal oscillation. Graph V denotes the rotational speed of the rotor 100.

As will be known from FIG. 19, when the frequency of the drive voltage signal SDR applied to diaphragm 10 is near 287 kHz, the phase difference of detection signal SD1 and detection signal SD2, that is, phase difference ϕ of longitudinal oscillation and sinusoidal oscillation, is greatest, and the rotational speed V of rotor 100 is also highest at this time.

The drive circuit 200 shown in FIG. 17 was designed with consideration for the characteristics of such a diaphragm 10, and controls the frequency of drive voltage signal SDR in order to maintain the substantially greatest phase difference between detection signals SD1 and SD2.

This drive circuit 200 has a driver 201, ϕ-V conversion circuit 202, delay circuit 203, comparator circuit 204, voltage adjusting circuit 205, and VCO (voltage-controlled oscillator) 206.

The driver 201 is a circuit for amplifying output signal Sdr of VCO 206 and applying drive voltage signal SDR to drive electrodes 33 of diaphragm 10. It should be noted that in the initialized state the driver 201 outputs a drive voltage signal SDR of a specific default frequency. Output of this drive voltage signal SDR at the default frequency is to set the initial oscillations of the diaphragm 10, that is, to make the diaphragm 10 oscillate at the default frequency in the initialization state. This initialization can be achieved by such methods as inputting a signal with a default frequency to the driver 201, or applying a frequency control voltage for oscillating at the default frequency to the VCO 206.

Figure 20:
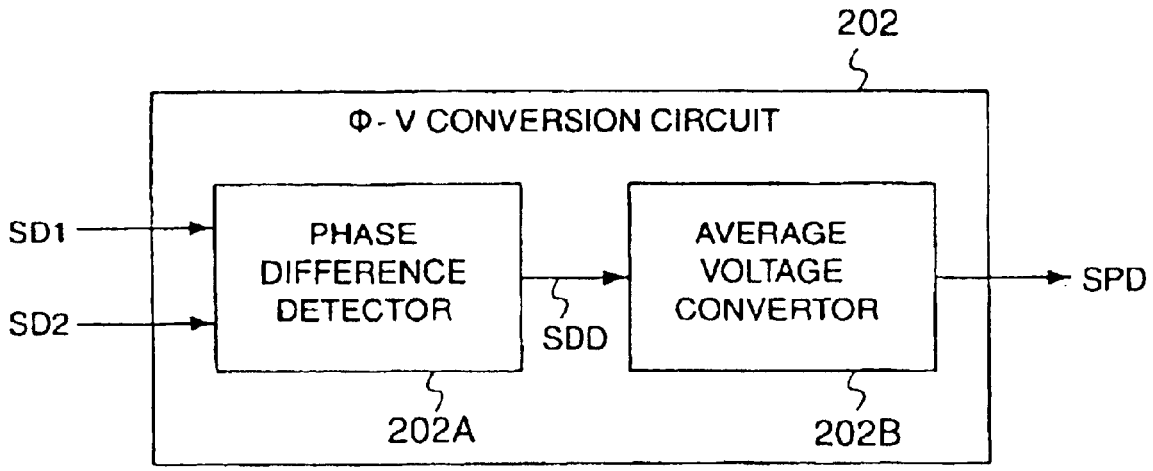
FIG. 20 is a block diagram showing the configuration of the $\phi$-V conversion circuit in FIG. 17.
Figure 21:
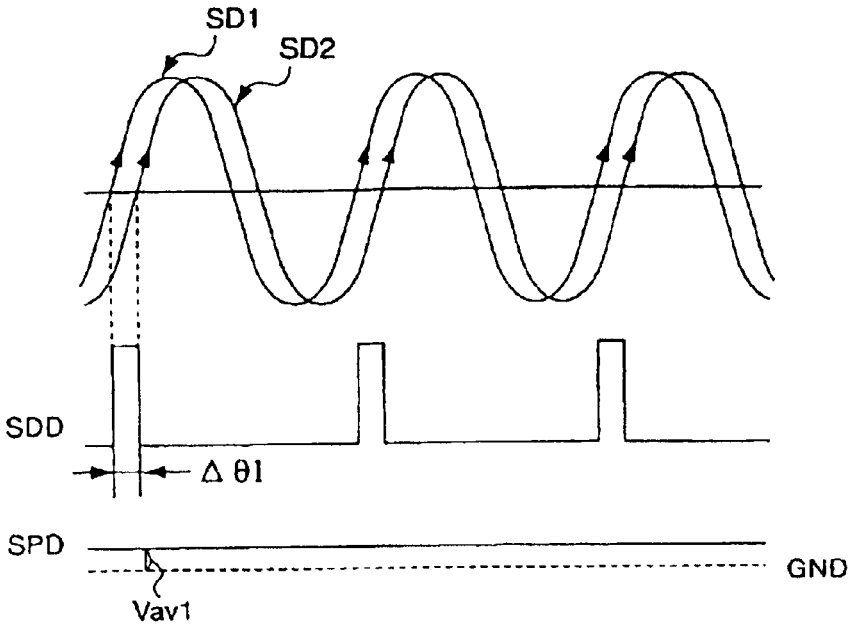
FIG. 21 and FIG. 22 show the waveform at each part of the same $\phi$-V conversion circuit.
Figure 22:
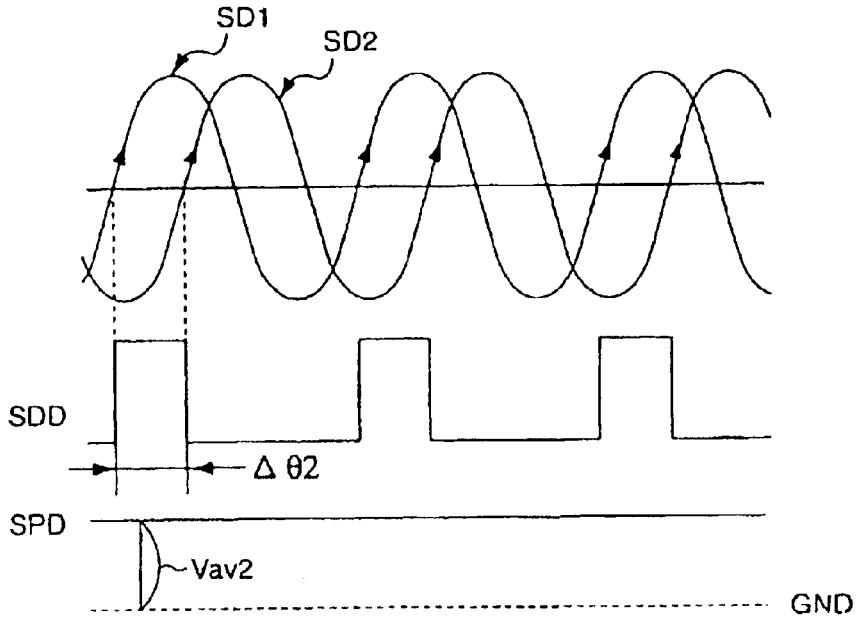

When the diaphragm 10 oscillates due to application of the drive voltage signal SDR, detection signal SD1 and detection signal SD2 are output from oscillation detection electrodes T1 and T2 of diaphragm 10. The ϕ-V conversion circuit 202 is a circuit for outputting a signal according to the phase difference of detection signal SD1 and detection signal SD2, and as shown in FIG. 20 has a phase difference detector 202A and an average voltage converter 202B. FIG. 21 and FIG. 22 show the waveforms at parts of the ϕ-V conversion circuit 202. The phase difference detector 202A generates a phase difference signal SDD of a pulse width equivalent to the phase difference of detection signals SD1 and SD2. The average voltage converter 202B averages the phase difference signals SDD, and outputs a phase difference signal SPD at a level proportional to the phase difference of detection signals SD1 and SD2. In the example shown in FIG. 21 the phase difference of detection signals SD1 and SD2 is small. As a result, a phase difference signal SDD with a small pulse width θ1 is output, and a phase difference signal SPD with a low voltage level Vav1 is output. In the example shown in FIG. 22, the phase difference of detection signals SD1 and SD2 is large. As a result, a phase difference signal SDD with a large pulse width θ2 is output, and a phase difference signal SPD with a high voltage level Vav2 is output.

Phase difference signal SPD is supplied to comparator circuit 201. SPD is also delayed a specific time by the delay circuit 203, and then supplied to the comparator circuit 204 as signal DSPD.

The comparator circuit 204 determines the difference of signal SPD and signal DSPD, determines if the time derivative of the phase difference of signals SD1 and SD2 is positive or negative, and based on the result of this determination applies voltage adjustment control signal SCT to voltage adjusting circuit 205.

The voltage adjusting circuit 205 increases or decreases the frequency control voltage SVC applied to VCO 206 according to the voltage adjustment control signal SCT applied from comparator circuit 204. The VCO 206 oscillates at a frequency determined by this frequency control voltage SVC, and outputs signal Sdr to the driver 201.

In the drive circuit 200 thus described, control increasing the oscillation frequency of the VCO 206 is applied by the comparator circuit 204 when the phase difference of detection signals SD1 and SD2 increases due to an increase of the oscillation frequency of VCO 206. In addition, when the phase difference of detection signals SD1 and SD2 decreases due to an increase in the oscillation frequency of VCO 206, control lowering the oscillation frequency of VCO 206 is applied by the comparator circuit 204. As a result of applying such control, VCO 206 oscillates at a frequency maintaining the substantially greatest phase difference between detection signals SD1 and SD2.

[1.4] Operation of this Embodiment

Figure 23:
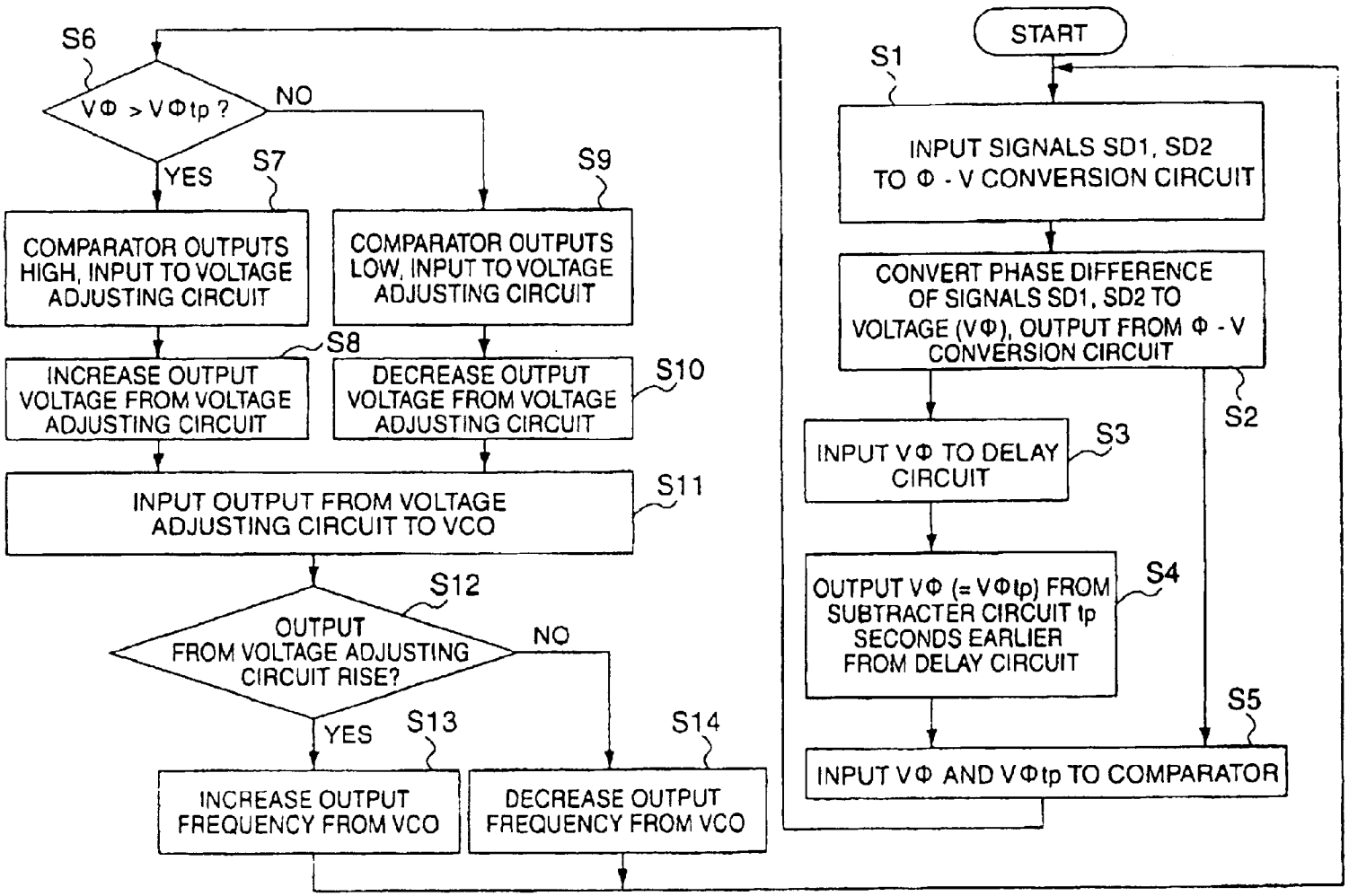
FIG. 23 is a flow chart showing the operation of the same drive circuit.

FIG. 23 is a flow chart showing the operation of the drive circuit 200 in the present embodiment. Operation of the present embodiment is described below according to this flow chart. When a time at which the date changes and date counter 50 must be turned the amount for one day comes, a start operation command is applied to the drive circuit 200 from a control circuit not shown in the figures, and the initialization drive signal is applied to the driver 201 for a specific period of time. While this initialization drive signal is applied to the driver 201, the frequency of the initialization drive signal gradually rises with time. The range of change in the frequency of the initialization drive signal is set to a frequency range sufficiently lower than the frequency at which the phase difference of longitudinal oscillation and sinusoidal oscillation in the diaphragm 10 is maximized. The driver 201 amplifies the default drive signal thus supplied to apply it as drive voltage signal SDR to the diaphragm 10. As a result, the diaphragm 10 beings to oscillate, and the frequency gradually rises.

When the specified time passes, supplying the default drive signal stops and drive circuit 200 operates according to the flow shown in FIG. 21. First, when detection signals SD1 and SD2 are output from oscillation detection electrodes T1 and T2 due to oscillation of the diaphragm 10, they are input to Φ-V conversion circuit 202 (step S1). The Φ-V conversion circuit 202 detects the phase difference Φ of detection signals SD1 and SD2, and outputs average phase difference voltage signal SPD having a voltage VΦ equivalent to the average phase difference (step S2). The delay circuit 203 receives this average phase difference voltage signal SPD from the Φ-V conversion circuit 202 (step S3): then, time tp after receiving SPD from the conversion circuit 202, the delay circuit 203 outputs the average phase difference voltage signal SPD as signal DSPD (step S4). When comparator circuit 204 receives signal SPD and signal DSPD (step S5), it determines if voltage VΦ of signal SPD is greater than VΦtp of signal DSPI).

It is assumed here, for example, that the phase difference ϕ of detection signals SD1 and SD2 is ϕk shown in FIG. 19, and a signal SPD with voltage Vϕ corresponding to this ϕk is applied to the comparator circuit 204. Furthermore, at the time earlier by time tp the phase difference ϕ of detection signals SD1 and SD2 is ϕj, which is less than ϕk, and a signal DSPD of voltage Vϕtp corresponding thereto is applied to the comparator circuit 204. The result of step S6 in this case is YES because Vϕ>Vϕtp. In this case the comparator circuit 204 sends a high level voltage adjustment control signal SCT to the voltage adjusting circuit 205 (step S7), and voltage adjusting circuit 205 increases the frequency control voltage SVC applied to the VCO 206 (steps S8, S11). When frequency control voltage SVC thus rises, the oscillation frequency of VCO 206 rises (steps S12, S13).

The same operation described above repeats for as long as phase difference ϕ increases due to an increase in the frequency of drive voltage signal SDR. As a result, drive voltage signal SDR gradually increases, and the phase difference ϕ of detection signals SD1 and SD2 gradually rises accordingly (see arrow P in FIG. 19).

As shown by way of example in FIG. 19, phase difference ϕ is greatest at a particular frequency (a frequency near 287 kHz in FIG. 19), but there are cases with the above operation in which the drive voltage signal SDR exceeds this frequency. The following operation is applied in such cases.

First, if the phase difference ϕ of detection signals SD1 and SD2 at a particular time is ϕn shown in FIG. 19, for example, a signal SPD of a voltage Vϕ corresponding to ϕn is applied to the comparator circuit 204. At the time earlier by time tp the phase difference ϕ of detection signals SD1 and SD2 is ϕm, which is greater than ϕn, and signal DSPD of voltage Vϕtp corresponding thereto is applied to the comparator circuit 204. The result returned by step S6 in this case is NO because Vϕ<Vϕtp. In this case the comparator circuit 204 sends a low level voltage adjustment control signal SCT to the voltage adjusting circuit 205 (step S9), and the voltage adjusting circuit 205 lowers the frequency control voltage SVC applied to VCO 206 (steps S10, S11). When the frequency control voltage SVC thus drops, the oscillation frequency of VCO 206 drops (steps S12, S13). As a result, phase difference ϕ, which had dropped, rises again as indicated by arrow Q in FIG. 19.

As a result of repeating such control the frequency of drive voltage signal SDR is held to a frequency at which the phase difference ϕ of detection signals SD1 and SD2, that is, the phase difference of longitudinal oscillation and sinusoidal oscillation of diaphragm 10, is substantially maximized, and rotor 100 rotates at the highest rotational speed. Rotational drive of the rotor 100 is also transferred by the calendar display mechanism shown in FIG. 1 and the date counter 50 turns only an angle equivalent to one day. The control circuit sends a drive stop command to the drive circuit 200 when it detects from a change in the voltage of contact 65 that the date counter 50 has turned an angle equivalent to one day. As a result, the drive circuit 200 stops outputting drive voltage signal SDR.

[2] Embodiment 2

This embodiment and the first embodiment described above differ only in the configuration of the drive circuit, and the other parts are therefore described with reference to the same figures as the first embodiment.

Figure 24:
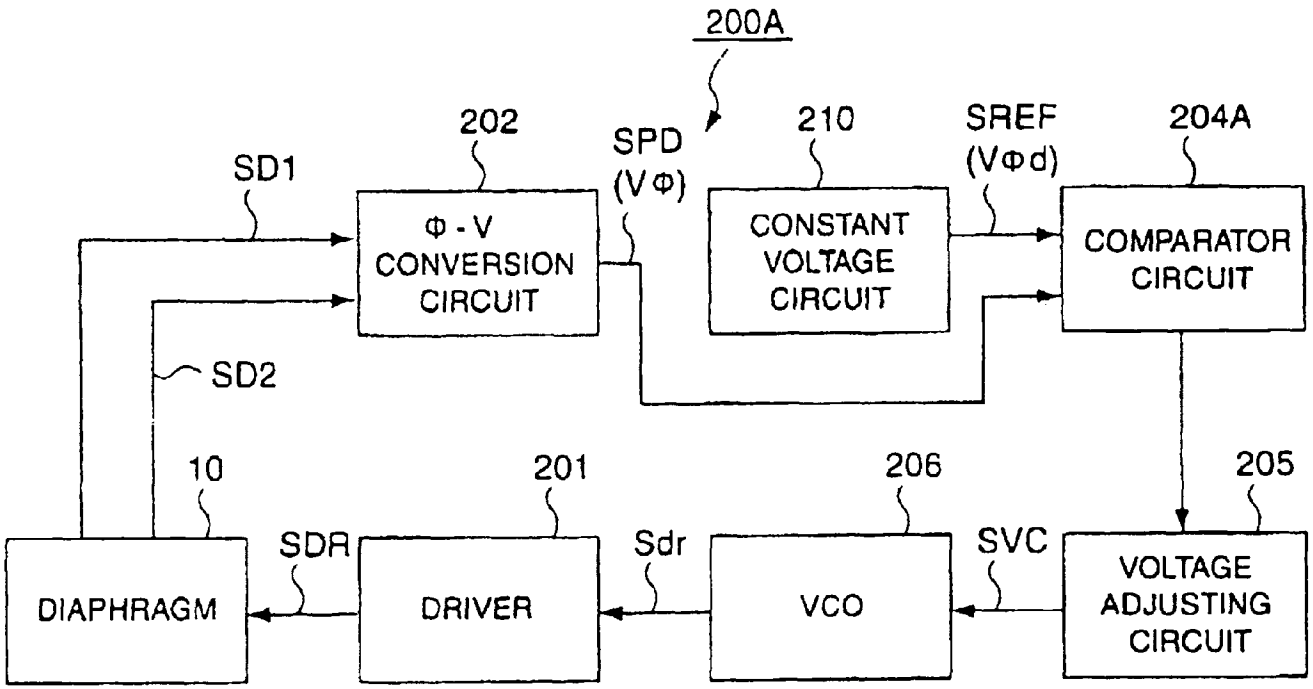
FIG. 24 is a block diagram showing the configuration of the drive circuit in a second embodiment of this invention.

FIG. 24 is a block diagram showing the configuration of the drive circuit 200A according to the present embodiment of the invention. This drive circuit 200A does not have a delay circuit 203 such as used in the drive circuit 200 of the first embodiment. The drive circuit 200A instead has a voltage regulator circuit 210. This voltage regulator circuit 210 outputs reference voltage SREF to comparator circuit 204A. This reference voltage SREF is a voltage of the same level as the voltage output from ϕ-V conversion circuit 202 when the phase difference ϕ of detection signals SD1 and SD2 obtained from diaphragm 10 is reference phase difference ϕd. This reference phase difference ϕd is a phase difference slightly lower than the maximum phase difference ϕ of detection signals SD1 and SD2 from diaphragm 10. When voltage SPD output from ϕ-V conversion circuit 202 is lower than reference voltage SREF, the comparator circuit 204A outputs a voltage adjustment command signal instructing an increase in frequency control voltage SVC causing the oscillation frequency of VCO 206 to rise. When voltage SPD is lower than reference voltage SREF, comparator circuit 204A outputs a voltage adjustment command signal instructing a decrease in frequency control voltage SVC, and the oscillation frequency of the VCO 206 decreases.

Figure 25:
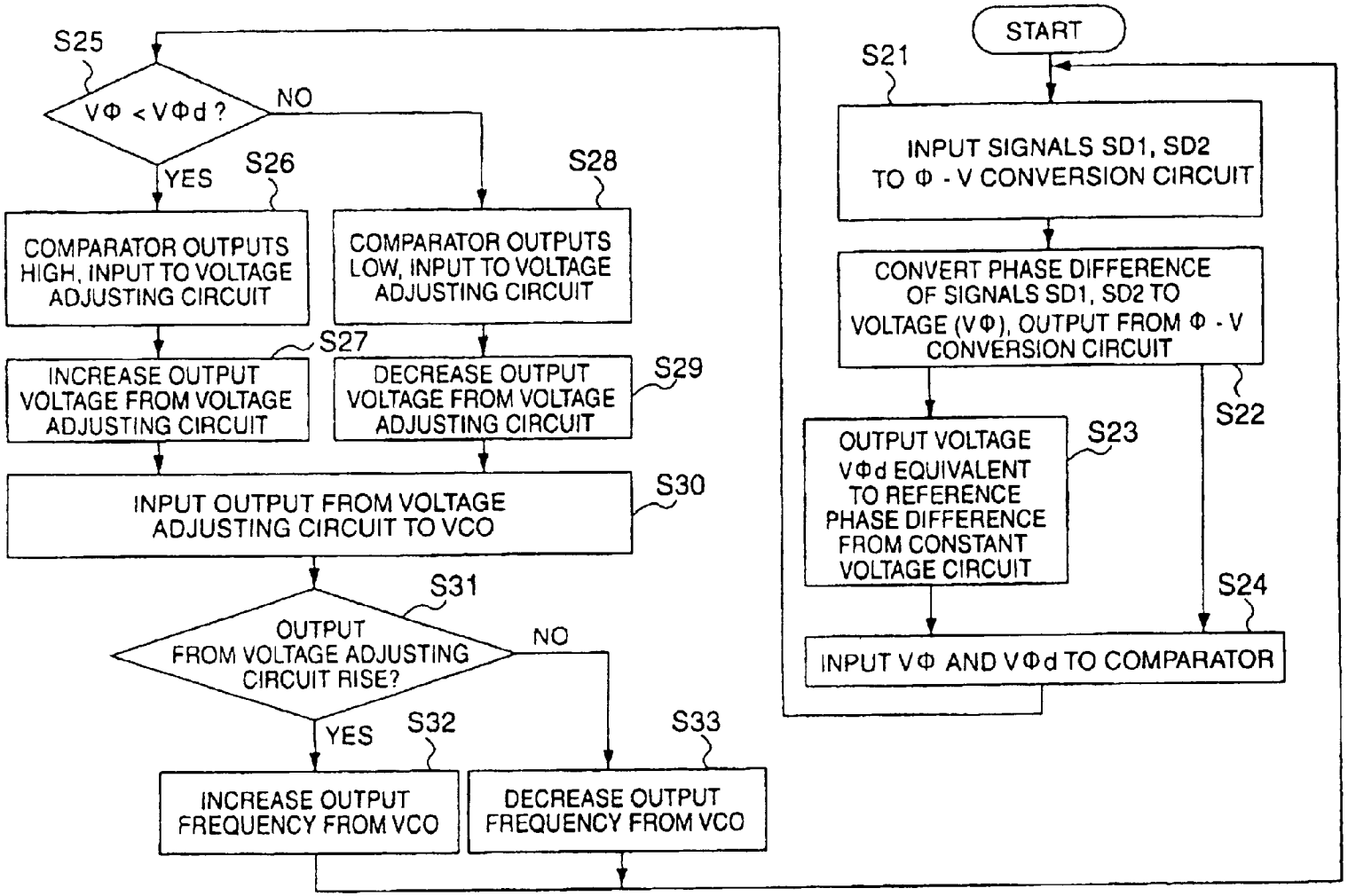
FIG. 25 is a flow chart showing the operation of the same drive circuit.

FIG. 25 is a flow chart showing the operation of drive circuit 200A in the present embodiment. Operation of the present embodiment is described below according to this flow chart. When detection signals SD1 and SD2 from diaphragm 10 are input to ϕ-V conversion circuit 202 (step S21), ϕ-V conversion circuit 202 detects phase difference ϕ of these detection signals SD1 and SD2, and outputs average phase difference voltage signal SPD having a voltage Vϕ equivalent to this average phase difference (step S22). On the other hand, constant voltage circuit 210 constantly outputs reference voltage Vϕd (step S23). When the comparator circuit 204 receives average phase difference voltage signal SPD and reference voltage Vϕd (step S24), it determines if voltage Vϕ of signal SPD is lower than reference voltage Vϕd (step S25).

When diaphragm 10 first starts to oscillate, the frequency of drive voltage signal SDR and the phase difference of detection signals SD1 and SD2 is small. As a result, step S25 returns YES. In this case comparator circuit 204 outputs a high level voltage adjustment control signal SCT to voltage adjusting circuit 205 (step S26) and voltage adjusting circuit 205 increases the frequency control voltage SVC applied to the VCO 206 (steps S27, S30). When the frequency control voltage SVC thus rises, the oscillation frequency of VCO 206 rises (steps S31, S32).

The operation described above repeats when the phase difference ϕ of detection signals SD1 and SD2 is less than reference phase difference ϕd and voltage Vϕ of signal SPD is less than reference voltage Vϕd. As a result, the oscillation frequency of VCO 206 gradually rises, and the phase difference ϕ of detection signals SD1 and SD2 increases. When phase difference ϕ exceeds reference phase difference ϕd and voltage Vϕ of signal SPD exceeds reference voltage Vϕd, step S25 returns NO.

In this case comparator circuit 204 sends a low level voltage adjustment control signal SCT to voltage adjusting circuit 205 (step S28), and voltage adjusting circuit 205 reduces the frequency control voltage SVC applied to VCO 206 (steps S29, S30). As a result, the oscillation frequency of VCO 206 drops when frequency control voltage SVC drops (step S31, S33).

As a result of repeating this control, the frequency of drive voltage signal SDR is held at a frequency at which the phase difference ϕ of detection signals SD1 and SD2, that is, the phase difference of longitudinal oscillation and sinusoidal oscillation of diaphragm 10, goes to the reference phase difference ϕd, and rotor 100 rotates at an appropriate rotational speed. Rotational drive of the rotor 100 is also transferred by the calendar display mechanism shown in FIG. 1 and the date counter 50 turns only an angle equivalent to one day. The control circuit sends a drive stop command to the drive circuit 200 when it detects from a change in the voltage of contact 65 that the date counter 50 has turned an angle equivalent to one day. As a result, the drive circuit 200 stops outputting drive voltage signal SDR.

[3] Embodiment 3

Figure 26:
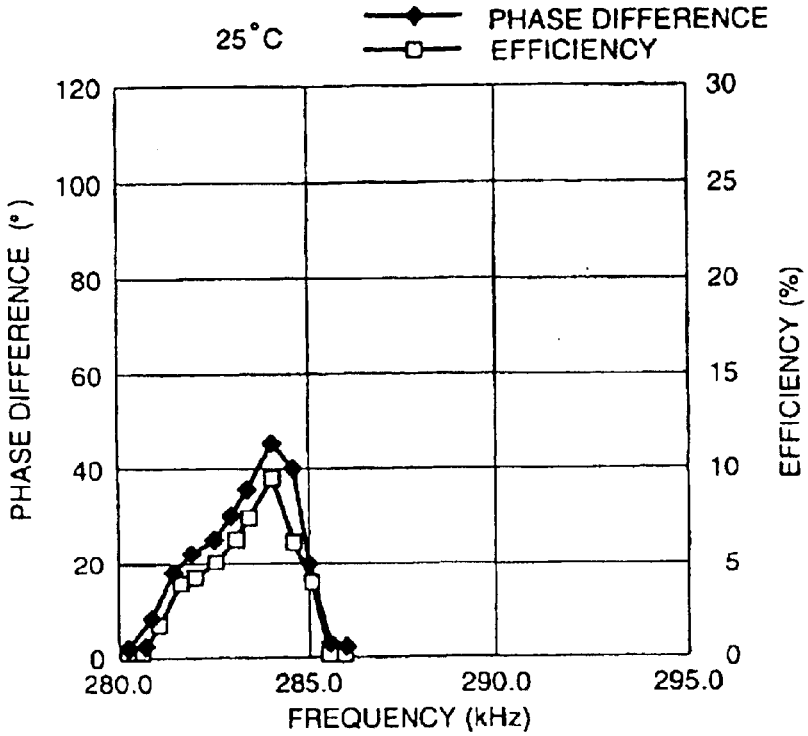
FIG. 26 and FIG. 27 show the change due to ambient temperature in piezoactuator characteristics.
Figure 27:
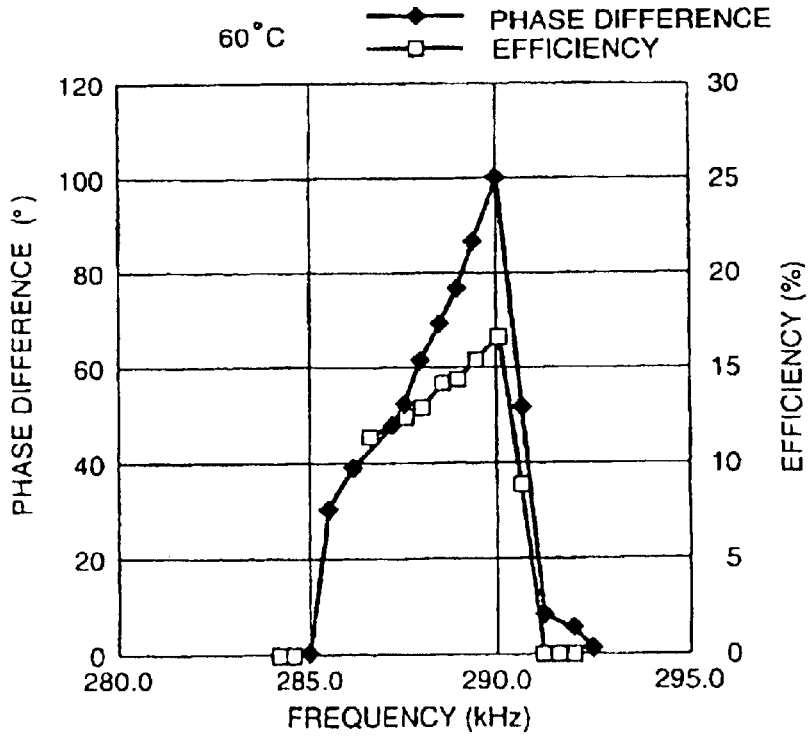

In the second embodiment described above the frequency of drive voltage signal SDR is controlled so that the phase difference of detection signals SD1 and SD2 obtained from diaphragm 10 goes to reference phase difference ϕd. In order to efficiently drive the rotor 100 with such frequency control, reference phase difference ϕd must be set as high as possible within a range not exceeding the maximum phase difference of detection signals SD1 and SD2 obtained from diaphragm 10. However, the maximum phase difference of detection signals SD1 and SD2 differs with individual piezoactuators and even with load and temperature. FIG. 26 shows the frequency characteristic of drive efficiency and the phase difference of detection signals SD1 and SD2 at a temperature of 25° C., and FIG. 27 shows the same frequency characteristic at a temperature of 60° C. If the reference phase difference ϕd is set to 60°, the frequency of drive voltage signal SDR achieving this phase difference when the temperature is 60° C. can be determined. However, the frequency of the drive voltage signal SDR at which the phase difference of detection signals SD1 and SD2 goes to reference phase difference ϕd cannot be determined when the temperature is 25° C.

Figure 28:
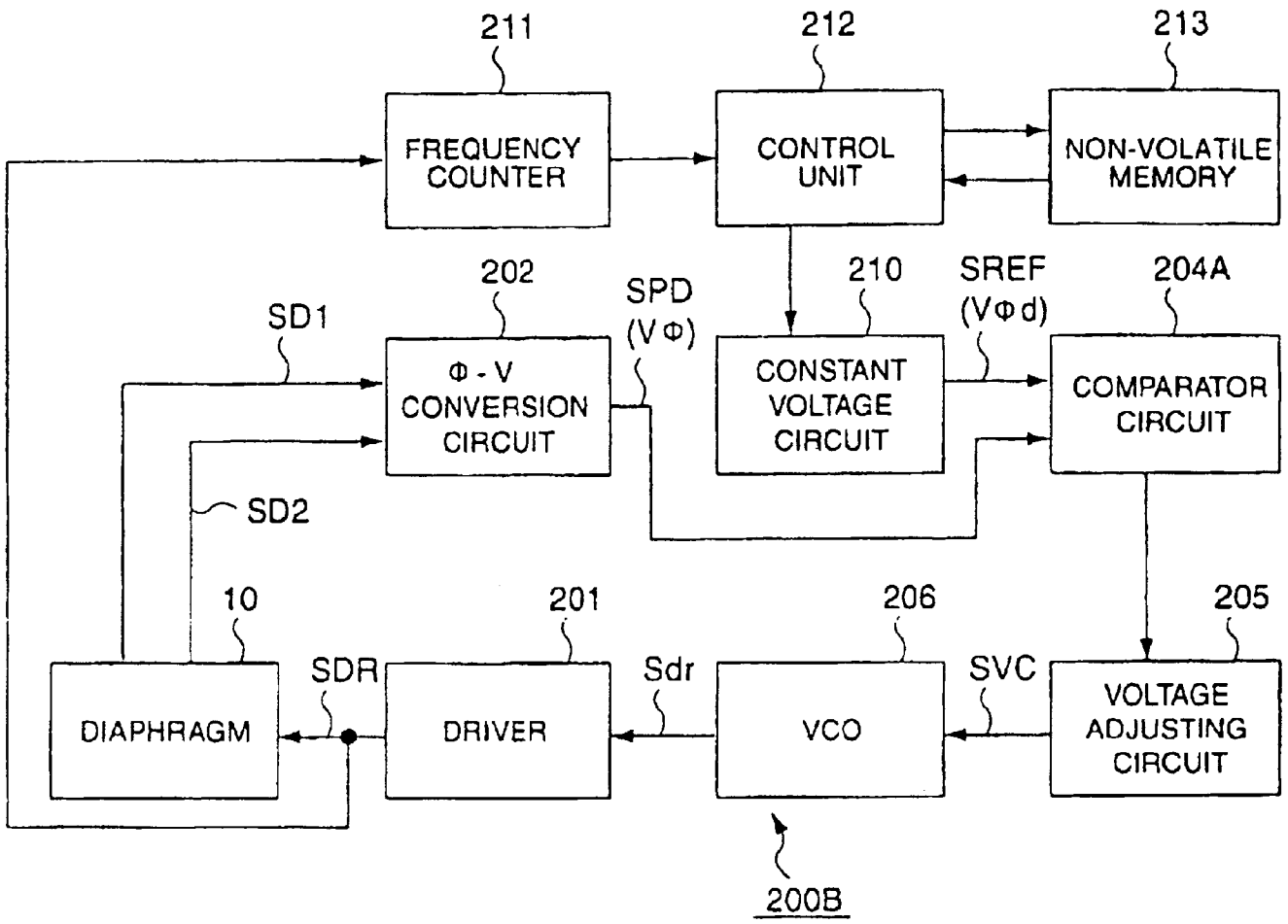
FIG. 28 is a block diagram showing the configuration of a drive circuit in a third embodiment of this invention.

This third embodiment of the invention solves this problem. FIG. 28 is a block diagram showing the configuration of a drive circuit 200B in the present embodiment. This drive circuit 200B comprises a frequency counter 211, control unit 212, and non-volatile memory 213 such as RAM backed up by battery added to the configuration of the drive circuit 200A in the second embodiment (FIG. 24).

The frequency counter 211 is a circuit for measuring the frequency of the drive voltage signal SDR. The non-volatile memory 213 has the job of storing the reference phase difference ϕd. When a piezoactuator according to the present embodiment is used in a wristwatch, a sufficiently large reference phase difference is stored to non-volatile memory 213. For example, the maximum possible phase difference of detection signals SD1 and SD2 or a greater value is first stored to the non-volatile memory 213. The reference phase difference in this non-volatile memory 213 is then updated by control unit 212 each time rotor 100 is driven. The control unit 212 determines the reference phase difference ϕd when rotor 100 is driven, and instructs the constant voltage circuit 210 to output reference voltage SREF corresponding to this reference phase difference ϕd. The reference phase difference stored to non-volatile memory 213 is referenced to determine reference phase difference ϕd. The control unit 212 also controls optimizing the reference phase difference in non-volatile memory 213.

Figure 29:
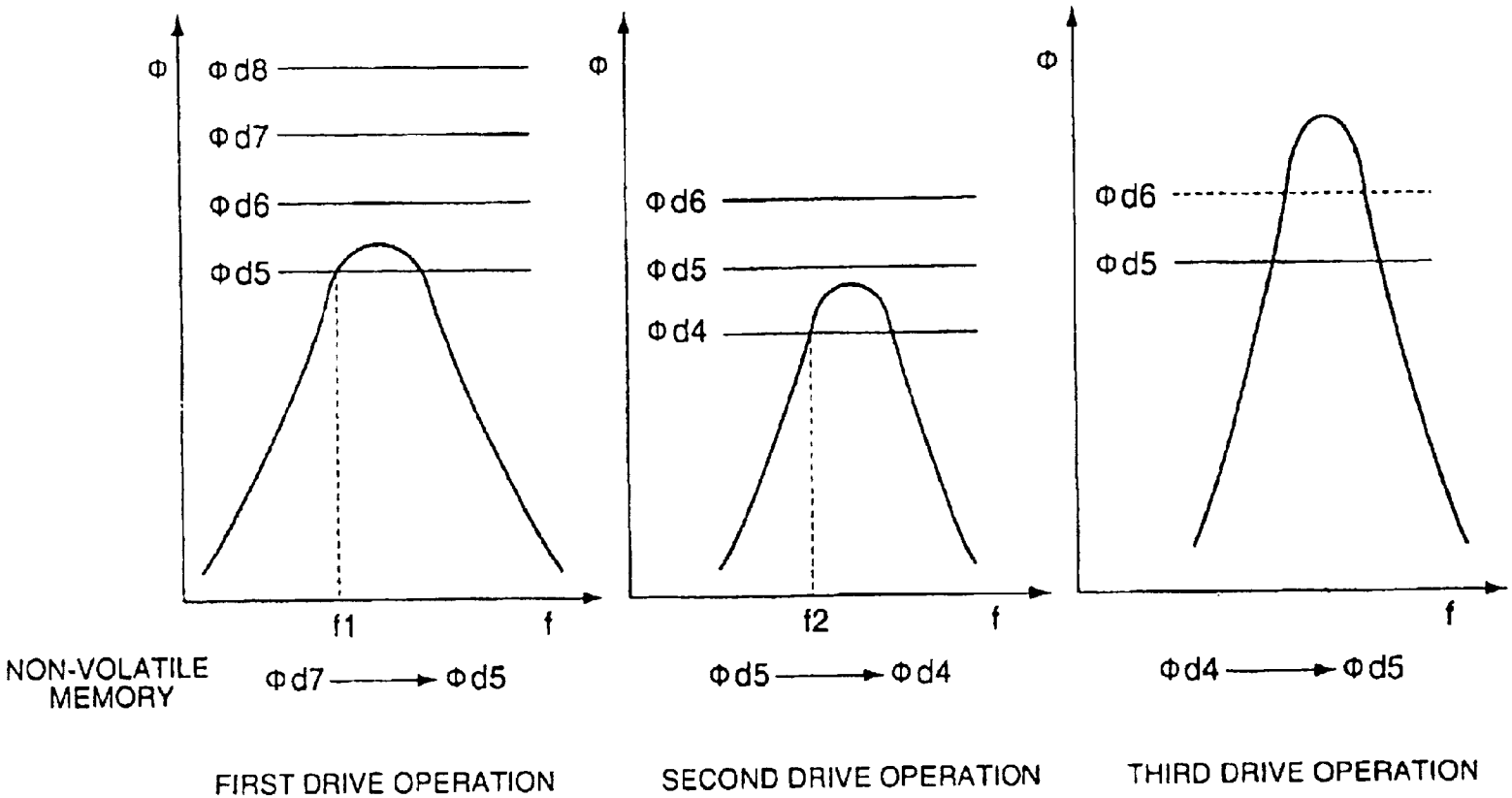
FIG. 29 shows an example of the operation of the same drive circuit.

Operation of drive circuit 200B when rotor 100 is driven three times is shown in FIG. 29.

When the rotor 100 is driven the first time, ϕd7 is stored as the reference phase difference in non-volatile memory 213. The control unit 212 therefore defines ϕd8, which is a specific amount greater than ϕd7, as reference phase difference ϕd, and commands the constant voltage circuit 210 to output a corresponding reference voltage SREF. When a reference voltage SREF corresponding to phase difference ϕd8 is output by constant voltage circuit 210, the frequency of drive voltage signal SDR begins to rise. At first the phase difference ϕ of detection signals SD1 and SD2 also rises in conjunction with the increase in the frequency of drive voltage signal SDR. However, after this phase difference reaches a maximum level, the phase difference ϕ of detection signals SD1 and SD2 decreases in conjunction with increase in the frequency of drive voltage signal SDR. The frequency of drive voltage signal SDR then reaches an upper frequency limit without phase difference ϕ reaching reference phase difference ϕd8.

The control unit 212 detects that the frequency of drive voltage signal SDR reached the maximum frequency from the measurement results from frequency counter 211. The control unit 212 at this time assumes that driving rotor 100 failed, and tells the constant voltage circuit 210 to stop reference voltage SREF. Next, control unit 212 decreases reference phase difference ϕd8 a specific amount to ϕd7, and tells the constant voltage circuit 210 to output a corresponding reference voltage SREF and operate the drive circuit 200B. In the example shown in the figure this drive attempt also ends in failure. Driving rotor 100 by drive circuit 200B with the reference phase difference set to ϕd6 is also attempted, but this attempt also ends in failure. When the control unit 212 then reduces the reference phase difference a specified amount from ϕd6 to ϕd5 and operates the drive circuit 200B, and the frequency of drive voltage signal SDR reaches frequency f1, the rotor 100 is driven with optimum efficiency. When the control unit 212 detects that driving rotor 100 ended normally, it stores reference phase difference ϕd5 to non-volatile memory 213.

Operation when driving the rotor a second time after this is described next.

In this case control unit 212 attempts to drive the rotor 100 by means of drive circuit 200B using ϕd6, which is a specific amount greater than ϕd5 stored in non-volatile memory 213, as reference phase difference ϕd, but this ends in failure. The control unit 212 therefore lowers the reference phase difference from ϕd6 to ϕd5, and operates the drive circuit 200B. This ϕd5 is the reference phase difference at which rotor drive was successful the first time. When the rotor is driven the second time, however, phase difference ϕd of detection signals SD1 and SD2 obtained from diaphragm 10 is lower overall, and driving rotor 100 using reference phase difference ϕd5 also fails. As a result, the control unit 212 operates the drive circuit 200B using ϕd4, which is a specific amount less than ϕd5, as the reference phase difference. In this case phase difference ϕ of detection signals SD1 and SD2 goes to reference phase difference ϕd4 when the frequency of drive voltage signal SDR reaches frequency f2. As a result, the rotor 100 is driven with optimum efficiency. When the control unit 212 detects that driving rotor 100 ended normally, it stores reference phase difference ϕd4 to non-volatile memory 213.

Operation when driving the rotor a third time after this is described next.

In this case control unit 212 attempts to drive the rotor 100 by means of drive circuit 200B using ϕd5, which is a specific amount greater than ϕd4 stored in non-volatile memory 213, as reference phase difference ϕd. Rotor drive failed the last time the reference phase difference was ϕd5. In this third rotor drive attempt, however, the phase difference ϕd of detection signals SD1 and SD2 obtained from diaphragm 10 is higher overall, and driving rotor 100 using reference phase difference ϕd5 is successful. When the control unit 212 detects that driving rotor 100 ended normally, it stores reference phase difference ϕd5 to non-volatile memory 213.

It will be noted that driving rotor 100 will be successful even if the reference phase difference ϕd is set to ϕd6, which is a specific amount greater. However, the rotor 100 is not driven using this reference phase difference ϕd6 during the third rotor drive operation. This is because the date counter already turned using reference phase difference ϕd5 and the drive object has been achieved. If there is no change in the characteristics of the diaphragm 10 the fourth time the rotor is driven, the rotor will be driven using reference phase difference ϕd6 at that time and reference phase difference ϕd6 will likely be stored to non-volatile memory 213.

As described above the present embodiment tracks changes in the characteristics of the piezoactuator, and is able to drive the rotor 100 with extremely high efficiency.

[4] Embodiment 4

Figure 30:
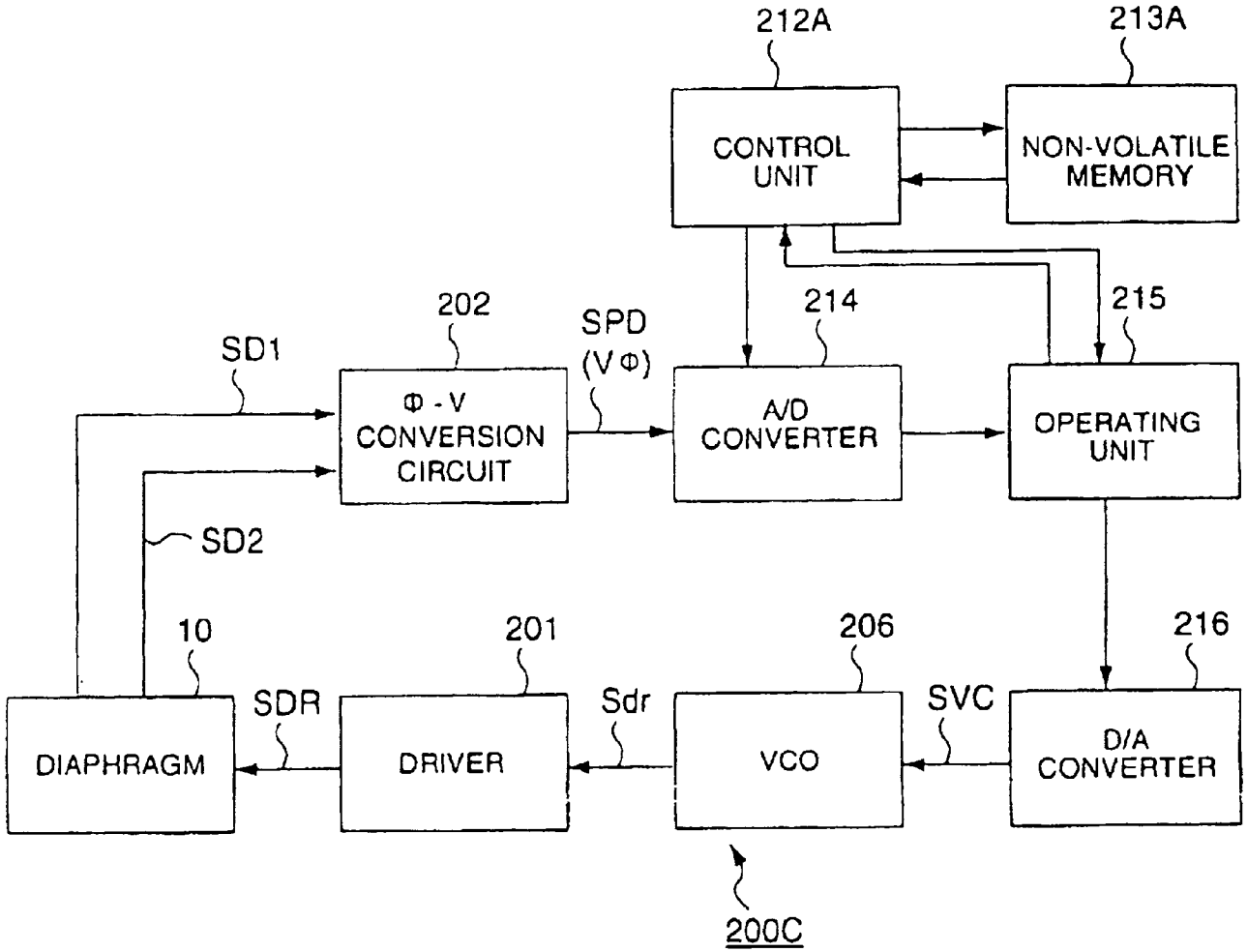
FIG. 30 is a block diagram showing the configuration of a drive circuit according to a fourth embodiment of this invention.

FIG. 30 is a block diagram showing the configuration of a drive circuit 200C for a piezoactuator in a fourth embodiment of this invention. In FIG. 30 VCO 206, driver 201, and ϕ-V conversion circuit 202 are the same as in the drive circuit 200 (FIG. 17) in the first embodiment, and description thereof is omitted.

A/D converter 214 is a circuit for converting the phase difference signal SPD output from ϕ-V conversion circuit 202 to a digital value according to a command from control unit 212A. Operating unit 215 is a circuit for determining the digital value DF of the frequency control voltage SVC supplied to VCO 206 according to a command from control unit 212A. Non-volatile memory 213A is memory for storing the digital value DF for frequency control and the digital value of the phase difference signal SPD when driving the rotor 100. The control unit 212A is a device for controlling each of the above-described parts. This control unit 212A has a function for calculating by means of the operating unit 215 an optimized digital value DF for frequency control considered to improve piezoactuator drive efficiency over the present when drive circuit 200C is driven to drive rotor 100, and update digital value DF.

Figure 31:
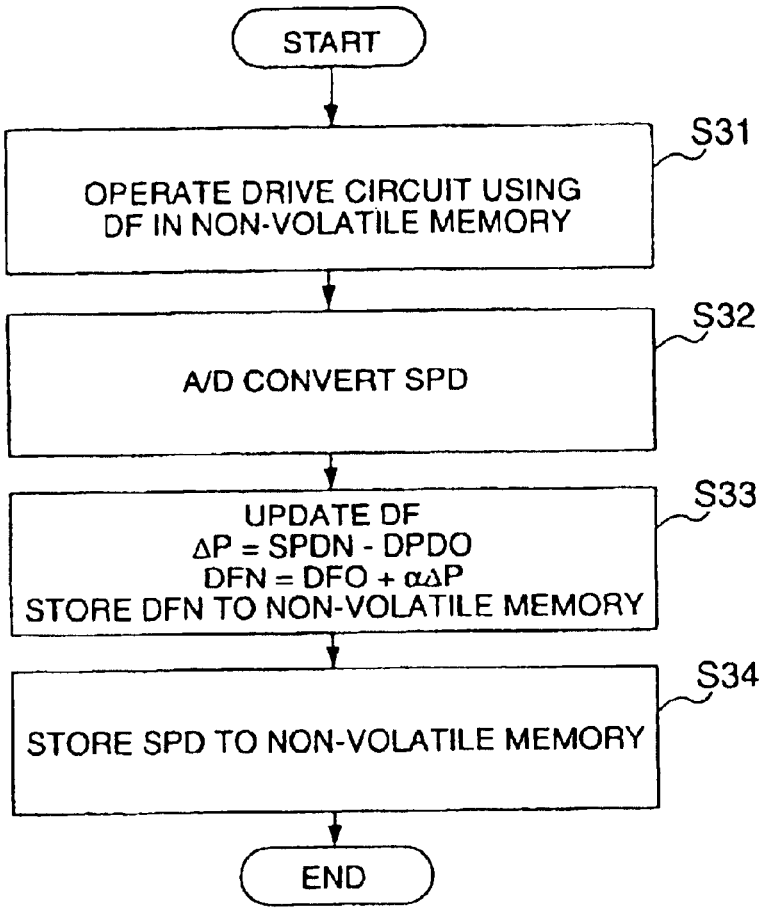
FIG. 31 is a flow chart showing the operation of the same drive circuit.

FIG. 31 is a flow chart of this digital value DF update operation. Control unit 212A performs this routine for rotor drive. First, control unit 212A sends the digital value DF stored to non-volatile memory 213A directly to D/A converter 216 through operating unit 215, causing it to output a corresponding frequency control voltage SVC (step S31). When this frequency control voltage SVC is output from D/A converter 216, VCO 206 oscillates at a corresponding frequency, and a drive voltage signal SDR with the same frequency is applied to diaphragm 10. The diaphragm 10 thus oscillates and motor 100 is driven. During this time the phase difference ϕ of detection signals SD1 and SD2 obtained from diaphragm 10 is detected by ϕ-V conversion circuit 202, and phase difference signal SPD is output.

Using this time while the rotor is driven, control unit 212A advances a process for updating DF and SPD in preparation for the next drive. First, the control unit 212A commands the A/D converter 214 to A/D convert this phase difference signal SPD (step S32).

Next, control unit 212A updates digital value DF in the non-volatile memory 213 according to the following process. First, it subtracts the digital value (here assumed to be SPDO) in non-volatile memory 213 from the digital value (here assumed to be SPDN) of the phase difference signal SPD obtained this time to determine difference P. Next, it obtains a new digital value DFN from the following equation using operating unit 215, and stores this as the new DF in non-volatile memory 213 (step S33).

$$DFN=DFO+\alpha\times\Delta P$$

where α is a constant optimized through tests and simulations.

Next, control unit 212A stores the digital value of phase difference signal SPD obtained this time to non-volatile memory 213 (step S34).

The above operation is performed each time the piezoactuator is driven to optimize the drive frequency of diaphragm 10.

Figure 32:
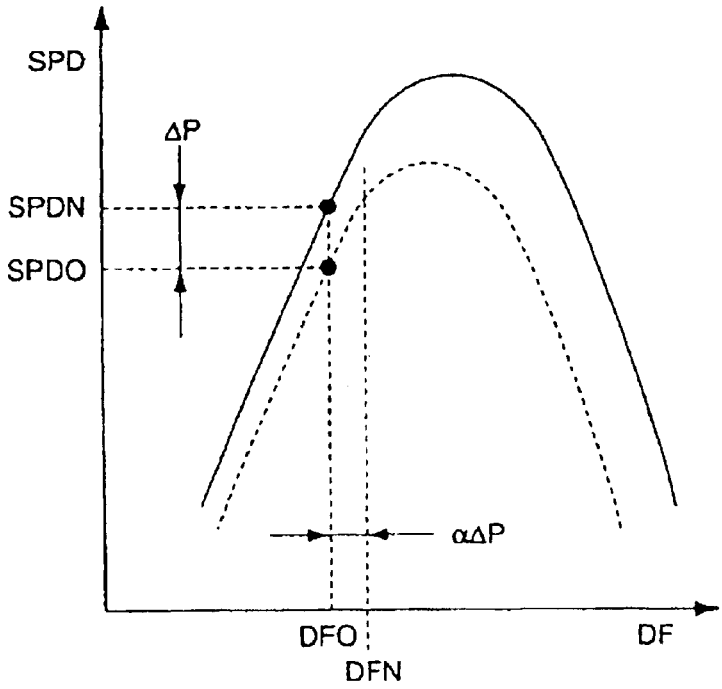
FIG. 32 and FIG. 33 show examples of the operation of the same drive circuit.
Figure 33:
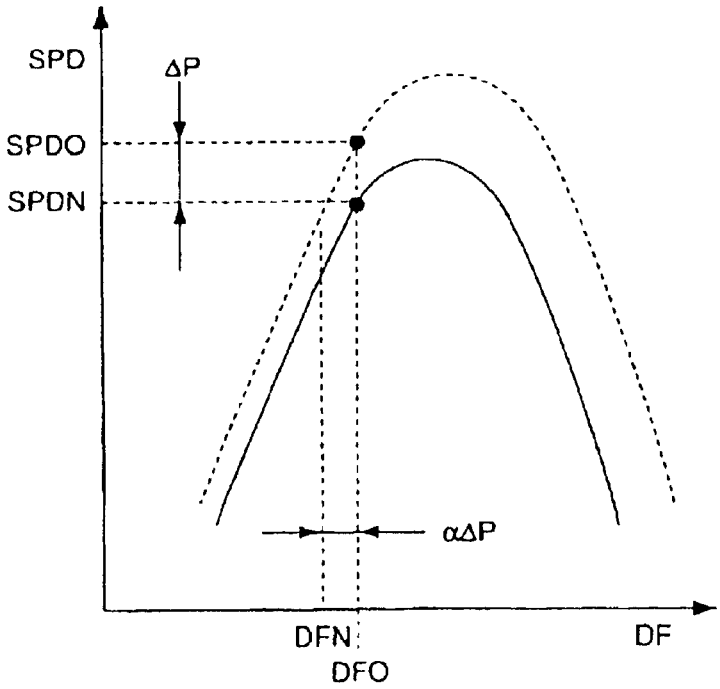

FIG. 32 and FIG. 33 show exemplary operations for optimizing the digital value DF of each frequency control voltage.

First, in the example shown in FIG. 32, phase difference signal SPD obtained from diaphragm 10 during piezoactuator drive is |ΔP| greater than the previous time, the drive time. If this situation continues there is a chance that phase difference ϕ will increase by further increasing the frequency of drive voltage signal SDR. Therefore, in preparation for the next drive the digital value DF of the frequency control voltage is increased just |α×ΔP|.

On the other hand, in the example shown in FIG. 33, phase difference signal SPD obtained from diaphragm 10 during piezoactuator drive is |ΔP| lower than the previous time, the drive time. If the frequency of the drive voltage signal SDR is left as is in this case, there is the chance that phase difference ϕ will drop suddenly. Therefore, in preparation for the next drive the digital value DF of the frequency control voltage is reduced just |α×ΔP|.

This embodiment also achieves the effect of tracking change in piezoactuator characteristics to drive the rotor 100 with extremely high efficiency.

[5] Other Applications for a Piezoactuator According to the Present Invention

The calendar display mechanism of a wristwatch described above is not the only application for a piezoactuator according to the present invention. This piezoactuator can also be applied in a variety of other applications. Examples of these are described below.

[5.1] Other Applications (1)

Figure 34:
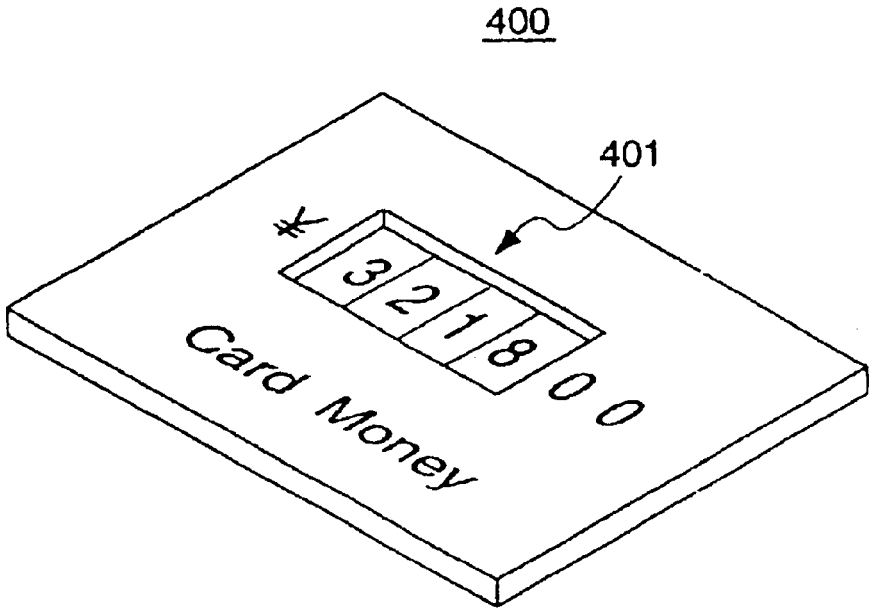
FIG. 34 shows the appearance of a contactless IC card.
Figure 35:
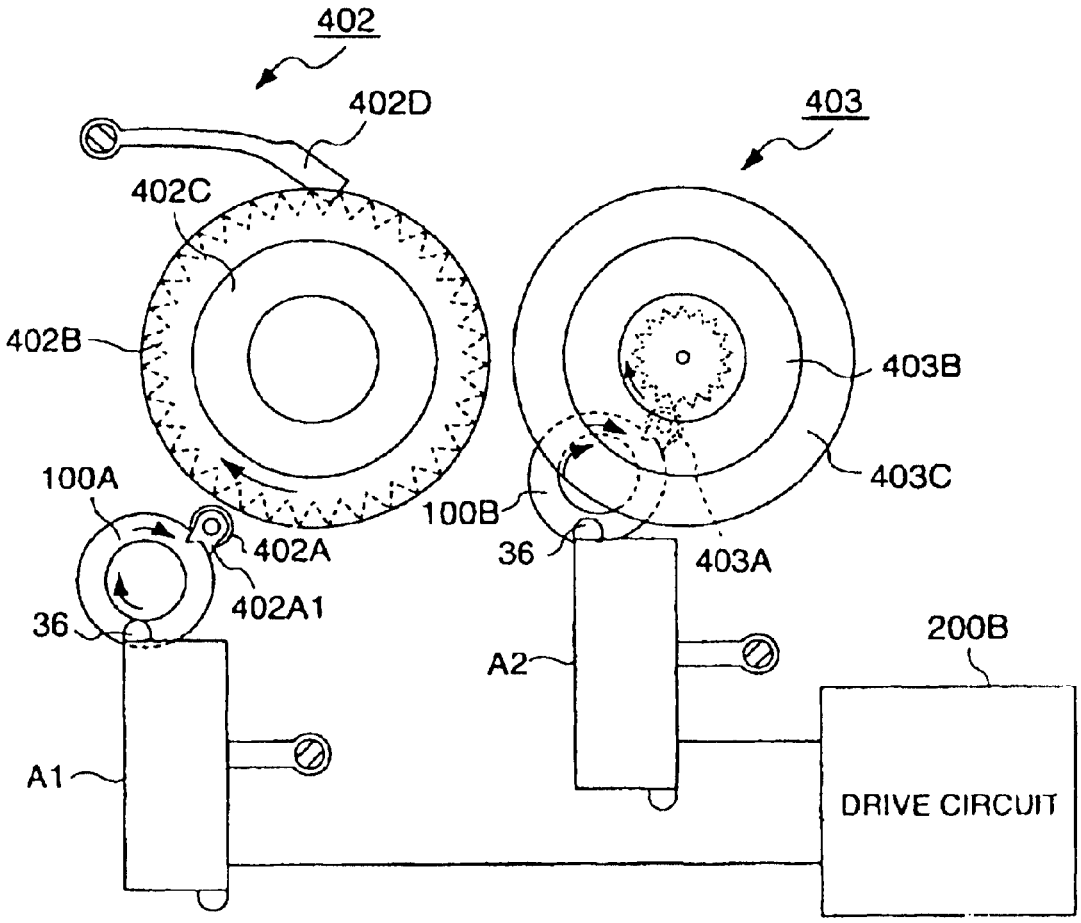
FIG. 35 shows the configuration of the remaining balance display counter of the same card.

FIG. 34 is an oblique view showing the appearance of a contactless type IC card. A remaining balance display counter 401 for displaying the remaining balance is provided on the front side of the contactless type IC card 400. The remaining balance display counter 401 displays a four-digit remaining balance, and as shown in FIG. 35 has a display part 402 for displaying the two high digits and a display part 403 for displaying the two low digits.

Figure 36:
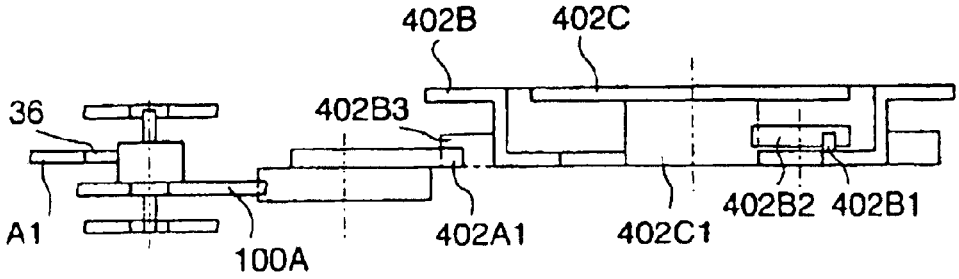
FIG. 36 is a side view showing the configuration of the high digit display part of the same card.

FIG. 36 is a side view showing the configuration of the high digit display part. 402. The high digit display part 402 is linked to piezoactuator A1 through intervening rotor 100A, and is driven by the drive force of the rotor 100A. The main parts of the high digit display part 402 include drive gear 402A having a driving part 402A and rotating one revolution when rotor 100A turns 1/n revolution, a first high digit display wheel 402B that turns one graduation for each revolution of the drive gear 402A, a second high digit display wheel 402C that rotates one graduation for each revolution of the first high digit display wheel 402B, and a holding pawl 402D for stopping the first high digit display wheel 402B when the first high digit display wheel 402B does not turn. It should be noted that a holding pawl not shown in the figures for stopping the second high digit display wheel 402C is also provided for the second high digit display wheel 402C.

The drive gear 402A rotates one revolution when the rotor 100A turns 1/n revolution. The driving pawl 402A meshes with the feed gear part 402B3 of the first high digit display wheel 402B, and the first high digit display wheel 402B turns one graduation.

It should be noted that turning rotor 100A 1/n revolution is only one operating example and the invention shall not be so limited. Furthermore, turning the first high digit display wheel 402B one graduation when the drive gear 402A turns one revolution is also just one example of operation, and the invention shall not be so limited.

In addition, when the first high digit display wheel 402B turns and rotates one revolution, feed pin 402B disposed on the first high digit display wheel 402B causes feed gear 402B2 to turn, turning feed gear 402C of second high digit display wheel 402C meshed with feed gear 402B, and thereby turning the second high digit display wheel 402C one graduation.

The low digit display part 403 is linked to piezoactuator A2 through intervening rotor 100B and is driven by the drive power of the rotor 10B. The main parts of the low digit display part 403 include drive gear 403A having a driving pawl 403A1 and rotating one revolution when rotor 100B turns 1/n revolution, a first low digit display wheel 403B that turns one graduation for each revolution of the drive gear 403A, and a second low digit display wheel 403C that rotates one graduation for each revolution of the first low digit display wheel 403B.

Figure 37:
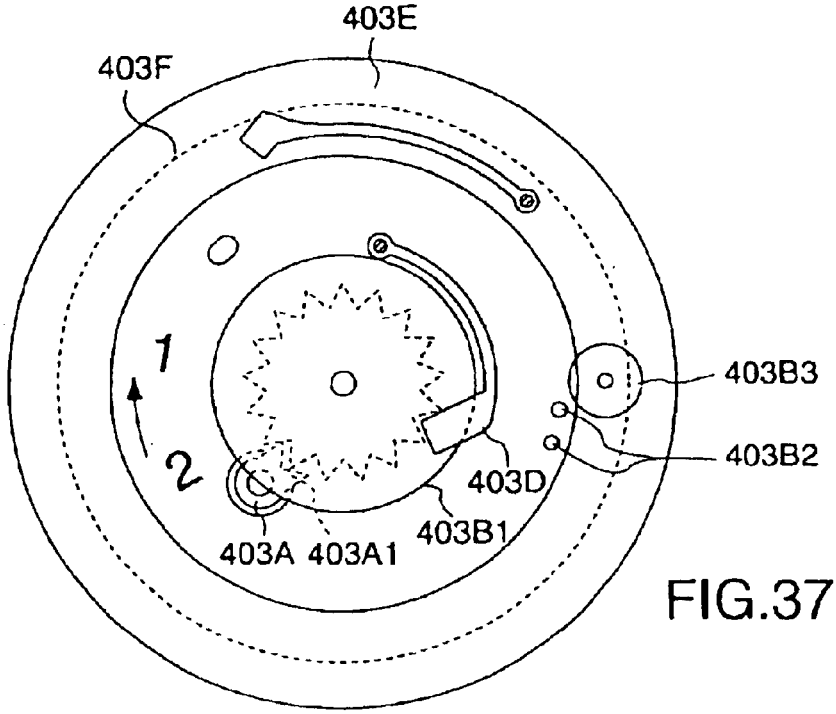
FIG. 37 is a front view showing the configuration of the low digit display part of the same card.
Figure 38:
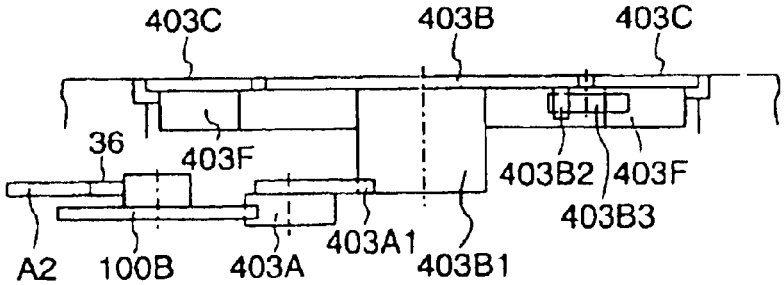
FIG. 38 is a side view showing the configuration of the low digit display part of the same card.

A front view of the low digit display part 403 is shown in FIG. 37 and a side view in FIG. 38.

The first low digit display wheel 403B has a feed gear part 403B1 meshed with driving pawl 403A1 of drive gear 403A, and turns one graduation for each one revolution of the drive gear 403A.

A feed pin 403B2 is also provided on the first low digit display wheel 403B to turn feed gear 403B3 each time the first low digit display wheel 403B turns one revolution, and thereby turn second low digit display wheel 403C one graduation.

A holding pawl 403D of the first low digit display wheel 403B engages the feed gear part 403B1 when not turning to stop the first low digit display wheel 403B. Holding pawl 403E of the second low digit display wheel 403C engages feed gear part 403F when the second low digit display wheel 403C is not turning to stop the second low digit display wheel 403C.

In this configuration actuator A1 and actuator A2 are set to be synchronously driven by drive circuit 200B, and drive circuit 200B is driven when a drive control signal equivalent to the transaction amount is input by an IC card chip not shown in the figures.

A remaining balance display can thus be achieved even in a thin contactless IC card, and because the display can be presented even when not driven without requiring a power source, the balance can be displayed with low power consumption and the balance to that point can be displayed even when the power supply is depleted.

[5.2] Other Applications (2)

A piezoactuator and drive circuit therefor according to the present invention are also suited to applications such as rotating a driven part only a specific angle according to some sort of trigger. In a preceding embodiment the present invention was applied to a calendar display mechanism as an example of a display mechanism for time-related information. Essentially, in each of the above embodiments the drive circuit drives a piezoactuator when the time at which the date should be advanced is reached, and this piezoactuator drives the calendar display mechanism of the wristwatch and turns the date counter an amount equivalent to one day. In addition, wristwatches also have a display mechanism for information relating to time, and application of the piezoactuator to such display mechanisms is also possible. A drive mechanism for a second hand for displaying seconds is one such example. The present invention can be applied to the second hand drive mechanism by configuring the second hand drive system so that it is linked to a rotor rotationally driven by the piezoactuator in the above embodiments. When thus configured the piezoactuator is also driven by the drive circuit each time passage of one second is indicated by the clock circuit. Piezoactuator drive in this case lasts until piezoactuator drive force is transferred through the rotor to the second hand drive mechanism and the second hand advances one second.

[6] Variations of the Embodiments

[6.1] First Variation

In order to converge the frequency of the drive voltage signal SDR to the frequency at which the phase difference of the detection signals SD1 and SD2 obtained from diaphragm 10 is greatest, the first embodiment described above determines the time derivative of this phase difference, increases the frequency of the drive voltage signal SDR when the time derivative is positive, and decreases the frequency when negative. In order to quickly maximize the phase difference of detection signals SD1 and SD2, it is effective here to increase the gain of the closed loop (see FIG. 17) consisting of diaphragm 10, $\phi$-V conversion circuit 202, delay circuit 203, comparator circuit 204, voltage adjusting circuit 205, VCO 206, and driver 201. However, if the gain of this closed loop is too high, the closed loop responds excessively to slight changes in the phase difference, and a frequency at which the phase difference is an extreme high value that is not the maximum may be captured so that sweeping the frequency of drive voltage signal SDR stops. To address this problem, this variation inserts a loop filter with an adjustable filter coefficient to a suitable place in the closed loop. By adjusting the filter coefficient of the loop filter, this variation can adjust the closed loop gain so that the phase difference of detection signals SD1 and SD2 can be quickly driven to the true maximum.

[6.2] Second Variation

When the initial frequency of the drive voltage signal SDR is low in the above first embodiment, the time required to bring the frequency of the drive voltage signal SDR to the frequency at which the phase difference of detection signals SD1 and SD2 is maximized becomes longer. In the present variation, therefore, when the frequency of the drive voltage signal SDR converges to the frequency at which the phase difference of detection signals SD1 and SD2 is maximized during rotor 100 drive, the frequency control voltage SVC at that time is converted to a digital value and stored in memory. Then, the next time the rotor 100 is driven the digital value stored in memory is converted to an analog voltage, and a frequency control voltage SVC that is lower by a specific amount is applied to the VCO 206 to start drive voltage signal SDR frequency control. When thus comprised the time required for the frequency of the drive voltage signal SDR to reach the frequency at which the phase difference of detection signals SD1 and SD2 is maximized can be shortened.

[6.3] Third Variation

Longitudinal oscillation and sinusoidal oscillation can be separately detected with a piezoactuator in each of the above embodiments because electrodes for detecting longitudinal oscillation and electrodes for detecting sinusoidal oscillation are separately provided. A variation using this characteristic is shown in FIG. 39.

Figure 39:
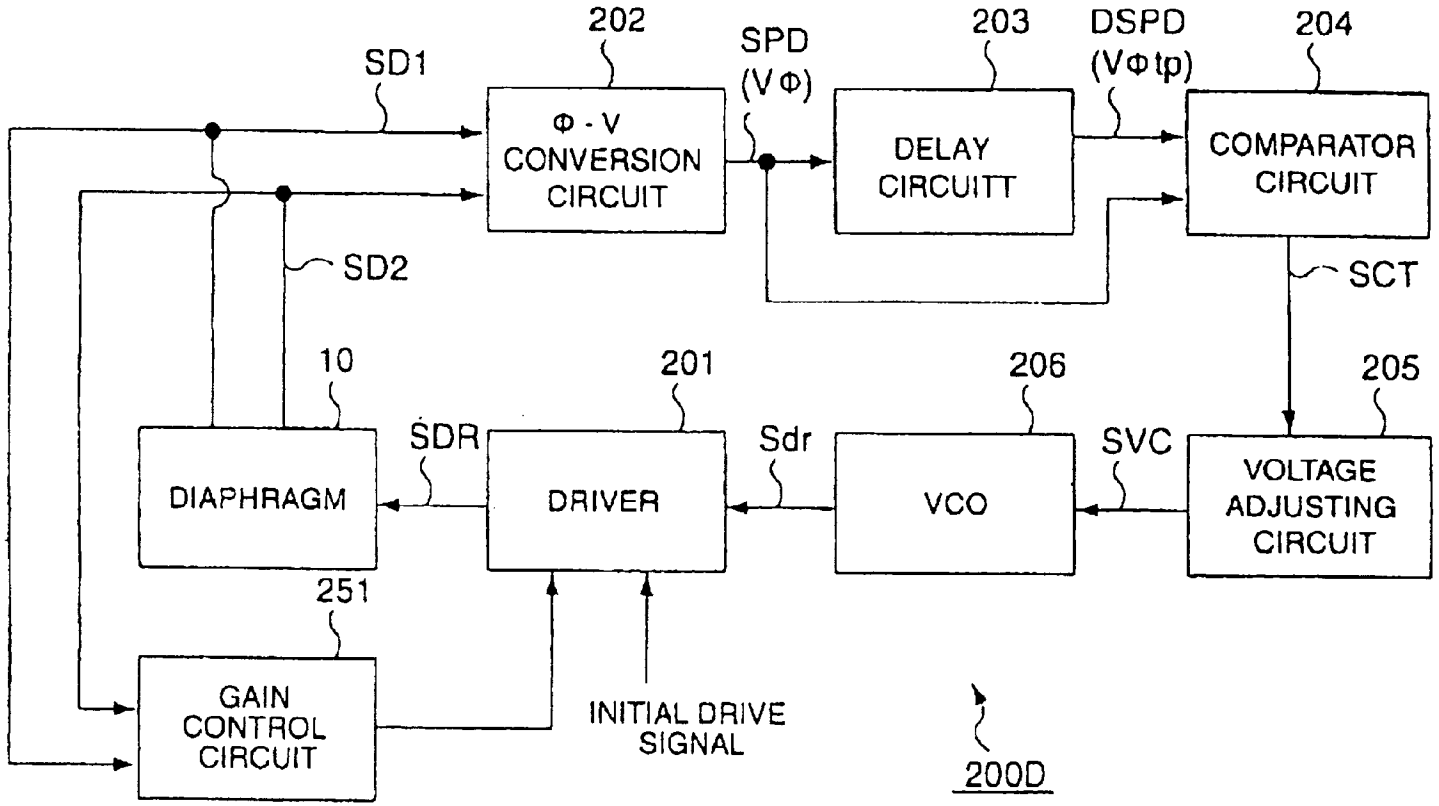
FIG. 39 and FIG. 40 are block diagrams showing alternative drive circuit configurations.

This drive circuit 200D shown in FIG. 39 adds a gain control circuit 251 to the drive circuit (see FIG. 17) in the first embodiment.

In order to appropriately drive the rotor 100, the amplitude of both longitudinal oscillation and sinusoidal oscillation must be high enough to overcome the surface roughness of the rotor 100.

Therefore, the gain control circuit 251 of the present variation increases the gain of the driver 201 to raise the drive voltage signal SDR when the magnitude of either longitudinal oscillation detection signal SD1 or sinusoidal oscillation detection signal SD2 obtained from diaphragm 10 is less than or equal to a threshold value. Automatic gain control using both detection signals SD1 and SD2 in this way is able to stabilize driving the rotor 100 by means of contact 36.

It should be noted that this variation can also be applied to the drive circuits of the second to fourth embodiments, and not just in the first embodiment.

[6.4] Fourth Variation

Figure 40:
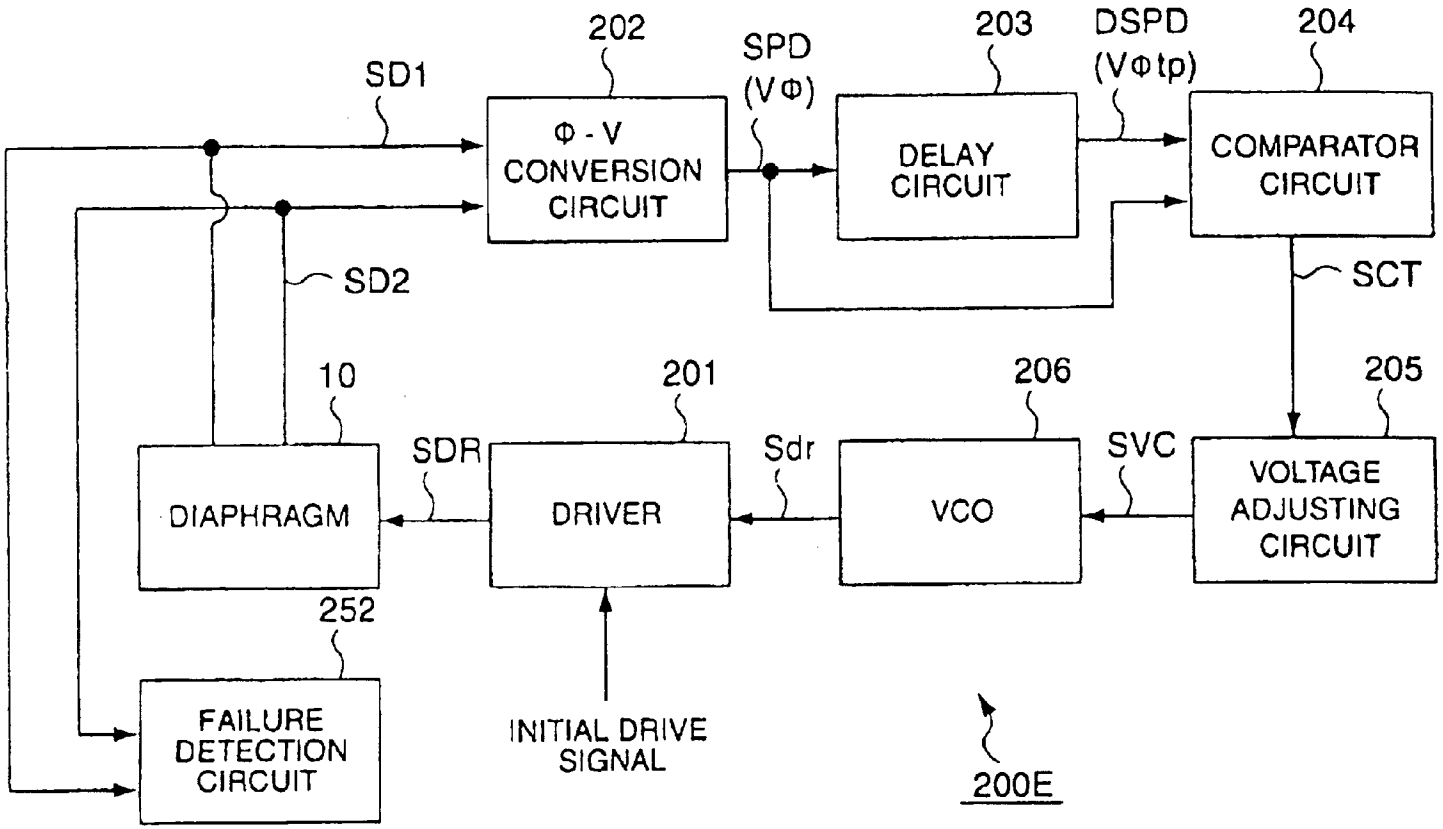

As does the first embodiment above, the variation shown in FIG. 40 also uses the ability to separately detect longitudinal oscillation and sinusoidal oscillation. This drive circuit 200E shown in FIG. 40 adds a failure detection circuit 252 to the drive circuit (see FIG. 17) in the first embodiment.

The amplitude of detection signal SD1 or SD2 decreases when the diaphragm 10 fails due, for example, to a crack developing in the piezoelectric elements of the diaphragm 10. When a phenomenon such as this is confirmed by the failure detection circuit 252, a signal indicative thereof is sent to the wristwatch control unit to display a failure.

This variation has the effect of being able to quickly inform the user when it becomes necessary to repair the piezoactuator.

It should be noted that this variation can also be applied to the drive circuits of the second to fourth embodiments, and not just in the first embodiment.

[6.5] Fifth Variation

When the above-described third embodiment sets a reference phase difference to operate the drive circuit and successfully drives the piezoactuator, it increases the reference phase difference a specific amount the next time the drive circuit is driven and attempts to drive the piezoactuator. Therefore, if there is no change over time in the characteristics of the piezoactuator, drive fails at the first drive circuit operation and drive succeeds the second time the drive circuit operates, and this sequence repeats each time the piezoactuator is driven. Conditions such as this are not desirable when this embodiment is applied to an apparatus driving the piezoactuator at relatively short time intervals. The present variation improves on this.

In the present variation control unit 212 of drive circuit 200B stores the reference phase difference at which drive succeeded to non-volatile memory 213 each time the piezoactuator is driven. When the piezoactuator is to be driven, the control unit 212 reads a specific number of past reference phase differences stored to non-volatile memory 213 and determines if the reference phase differences are the same. If the determination is YES, control unit 212 determines that the piezoactuator characteristics are stable over time, and for a specific period thereafter omits the process increasing the initial reference phase difference from the reference phase difference used the previous drive time. After this specific period passes, it resumes the process increasing the initial reference phase difference from the phase difference used the previous drive time.

[6.6] Sixth Variation

In the second to fourth embodiments the frequency of drive voltage signal SDR is controlled in order to achieve the greatest possible phase difference $\phi$ within the range in which the phase difference $\phi$ of detection signals SD1 and SD2 increases with an increase in the frequency of the drive voltage signal SDR (range in which the slope is positive). The embodiments of the invention shall not, however, be so limited. That is, it is also possible to control the frequency of drive voltage signal SDR to achieve the greatest possible phase difference $\phi$ within the range in which the phase difference $\phi$ of detection signals SD1 and SD2 decreases with an increase in the frequency of the drive voltage signal SDR (range in which the slope is negative).

[6.7] Seventh Variation

A variation in which a part of the drive circuit is controlled by software in the first to third embodiments above is also conceivable. Examples of software control in this case are described below.

<Variation of Embodiment 1 (FIG. 17)>

In this variation components other than the $\phi$-V conversion circuit 202, VCO 206, and driver 201 are replaced by a CPU and memory. The memory is used for data storage and program storage. An A/D converter is also disposed after the $\phi$-V conversion circuit 202, and a D/A converter is disposed before the VCO 206.

In this variation the CPU executes the following process according to routines stored in memory when a piezoactuator drive command is asserted.

S31: The digital value applied to the D/A converter is increased for a specific time to raise the oscillation frequency of VCO 206 to the initial value.

S32: Phase difference $\phi$ is received from the A/D converter, and the time derivative thereof is obtained.

S33: The digital value applied to the D/A converter is increased if the time derivative is positive, and decreased if negative.

S34: Processing ends if the change in phase difference $\phi$ is within a specific tolerance range, and processing otherwise returns to step S32.

<Variation of Embodiment 2 (FIG. 24)>

In this variation components other than the $\phi$-V conversion circuit 202, VCO 206, and driver 201 are replaced by a CPU and memory. The memory is used for data storage and program storage. An A/D converter is also disposed after the $\phi$-V conversion circuit 202, and a D/A converter is disposed before the VCO 206.

In this variation the CPU executes the following process according to routines stored in memory when a piezoactuator drive command is asserted.

S41: A digital value corresponding to the initial value of frequency control voltage SVC is applied to the D/A converter.

S42: Phase difference $\phi$ is received from the A/D converter, and the digital value applied to the D/A converter is increased if the phase difference is less than the reference phase difference, and is decreased if greater than.

S43: The process ends if the phase difference $\phi$ is within a specific tolerance range of the reference phase difference, and the process otherwise returns to step S42.

<Variation of Embodiment 3 (FIG. 28)>

In this variation components other than the frequency counter 211, $\phi$-V conversion circuit 202, VCO 206, and driver 201 are replaced by a CPU and memory. The memory is used for data storage and program storage. The reference phase difference is stored as data in memory. An A/D converter is also disposed after the $\phi$-V conversion circuit 202, and a D/A converter is disposed before the VCO 206.

In this variation the CPU executes the following process according to routines stored in memory when a piezoactuator drive command is asserted.

S51: The failure count is initialized to 0, and the reference phase difference is read from memory and increased a specific amount.

S52: The digital value applied to the D/A converter is initialized.

S53: Whether phase difference ϕ exceeds the reference phase difference is determined, and the process skips to step S56 if the result is YES.

S54: The digital value applied to the D/A converter is increased a specific amount.

S55: Whether the frequency of the drive voltage signal SDR output from frequency counter 211 is less than or equal to a specific value is determined; if the result is YES, the digital value applied to the D/A converter is increased a specific amount (S55A), and the routine returns to step S53; if the result is NO, the failure count is incremented 1, the reference phase difference is decreased a specific amount (S55B), and the routine returns to step S52.

S56: If the failure count is 0, the reference phase difference is increased a specific amount (step S56A) and the routine returns to step S52, otherwise the reference phase difference is stored to memory (step S56B) and the process ends.

The present invention can also be achieved by such modes as distributing the routines described above via an electrical communication circuit to users, or storing such routines to a computer-readable storage medium distributed to users. The users can write the desired routines thus obtained to the drive circuit memory.

[6.7] Seventh Variation

Wristwatches and contactless IC cards are described above as the portable devices, but it will be noted that the present invention can be applied to any type of portable device insofar as it is a portable electronic device requiring a drive system, and particularly a rotational drive system.

[6.8] Eighth Variation

A longitudinal oscillation mode oscillating in the longitudinal direction of the piezoactuator is used as the first oscillation mode, and a sinusoidal oscillation mode corresponding to the first oscillation mode is used as the second oscillation mode in the embodiments described above, but the invention shall not be so limited.

Specifically, a first longitudinal oscillation mode that is a longitudinal oscillation mode oscillating lengthwise to the piezoactuator can be used as a first oscillation mode, and a second longitudinal oscillation mode oscillating in a direction orthogonal to the first oscillation mode can be used as the second oscillation mode.

Furthermore, it is also possible to use the above-noted second longitudinal oscillation mode as the first oscillation mode, and use a sinusoidal oscillation mode corresponding to the second longitudinal oscillation mode.

The locations of the oscillation detection electrodes in these cases can be determined from tests.

[6.9] Ninth Variation

In addition to using a battery (primary cell or secondary cell) as the power source of the actuator, configurations using a power supply with an internal generator mechanism having a solar cell, thermoelectric generator, mechanical generator, or storage device (capacitor or secondary battery) can also be used.

What is claimed is:

1. A drive circuit for a piezoactuator, comprising:

at least one piezoelectric element having a first oscillation mode and a second oscillation mode, the at least one piezoelectric element being adapted to oscillate when an AC signal is applied to it, the second oscillation mode having a different oscillation direction than that of the first oscillation mode;

a driver for applying an AC drive voltage signal to the at least one piezoelectric element; and a frequency control unit for detecting a first electrical signal from the at least one piezoelectric element indicative of oscillation in the first oscillation mode, for detecting a second electrical signal from the at least one piezoelectric element indicative of oscillation in the second oscillation mode, and for controlling the frequency of the AC drive voltage signal to optimize the phase difference between the first and second electrical signals for a particular operating condition of the at least one piezoelectric element, *such that the phase difference is substantially maximized, the frequency control unit further comprising:*

*a phase difference detection circuit for detecting the phase difference between the first and second electrical signals;*

*a time differentiating circuit for determining a time differential of the phase difference detected by the phase difference detection circuit; and*

*a frequency adjusting circuit for increasing the frequency of the AC drive voltage signal when the time differential is positive, and decreasing the frequency of the AC drive voltage signal when the time differential is negative.*

[2. A drive circuit for a piezoactuator as described in claim 1, wherein the frequency control unit comprises a circuit for controlling the frequency of the AC drive voltage signal so that the phase difference between the first and second electrical signals is substantially maximized.]

[3. A drive circuit for a piezoactuator as described in claim 2, wherein the frequency control unit comprises:

a phase difference detection circuit for detecting the phase difference between the first and second electrical signals;

a time differentiating circuit for determining a time differential of the phase difference detected by the phase difference detection circuit; and a frequency adjusting circuit for increasing the frequency of the AC drive voltage signal when the time differential is positive, and decreasing the frequency of the AC drive voltage signal when the time differential negative.]

4. A drive circuit for a piezoactuator as described in claim [2] *1*, further comprising a voltage-controlled oscillator for supplying an output signal to the driver, wherein the frequency control unit controls the frequency of the AC drive voltage signal by increasing or decreasing a control voltage applied to the voltage-controlled oscillator.

5. A drive circuit for a piezoactuator as described in claim 4, wherein the frequency control unit comprises a memory for storing the voltage level of the control voltage when the frequency of the AC drive voltage signal is controlled to maximize the phase difference, wherein the frequency control unit determines an initial level of the control voltage based on the voltage level of the control voltage stored in memory when frequency control of the AC drive voltage signal is initiated and then increases or decreases the control voltage accordingly.

6. A drive circuit for a piezoactuator [as described in claim 1], *comprising:*

*at least one piezoelectric element having a first oscillation mode and a second oscillation mode, the at least one piezoelectric element being adapted to oscillate when an AC signal is applied to it, the second oscillation mode having a different oscillation direction than that of the first oscillation mode;*

*a driver for applying an AC drive voltage signal to the at least one piezoelectric element; and*

*a frequency control unit for detecting a first electrical signal from the at least one piezoelectric element*

*indicative of oscillation in the first oscillation mode, for detecting a second electrical signal from the at least one piezoelectric element indicative of oscillation in the second oscillation mode, and for controlling the frequency of the AC drive voltage signal to optimize the phase difference between the first and second electrical signals for a particular operating condition of the at least one piezoelectric element,* wherein the frequency control unit comprises a circuit for controlling the frequency of the AC drive voltage signal so that the phase difference substantially corresponds to a reference phase difference, *wherein the frequency control unit further comprises:*

*a drive evaluator adapted to determine if drive of the piezoactuator satisfies a particular performance characteristic; and*

*an initial reference phase difference adjustor adapted to reduce the reference phase difference so that the piezoactuator satisfies the particular performance characteristic when the drive evaluator determines that the piezoactuator does not satisfy the particular performance characteristic, and to increase the reference phase difference when the drive evaluator determines that the piezoactuator satisfies the particular performance characteristic.*

7. A drive circuit for a piezoactuator as described in claim 6, wherein the frequency control unit comprises:

a phase difference detection circuit for detecting the phase difference between the first and second electrical signals;

a comparator for comparing the phase difference detected by the phase difference detection circuit with the reference phase difference; and a frequency adjusting circuit for increasing or decreasing the frequency of the AC drive voltage signal based on the comparison result obtained by the comparator.

8. A drive circuit for a piezoactuator as described in claim 7, wherein the frequency control unit further comprises voltage-controlled oscillator for supplying an output signal to the driver; and herein the frequency adjusting circuit comprises a voltage adjusting circuit for increasing or decreasing the control voltage applied to the voltage-controlled oscillator based on the comparison result obtained by the comparator.

[9. A drive circuit for a piezoactuator as described in claim 6, wherein the frequency control unit comprises:

a drive evaluator adapted to determine if drive of the piezoactuator satisfies a particular performance characteristic; and an initial reference phase difference adjustor adapted to reduce the reference phase difference so that the piezoactuator satisfies the particular performance characteristic when the drive evaluator determines that the piezoactuator does not satisfy the particular performance characteristic, and to increase the reference phase difference when the drive evaluator determines that the piezoactuator satisfies the particular performance characteristic.]

10. A drive circuit for a piezoactuator as described in claim [9] *6*, wherein, when it is determined that the reference phase difference at which the piezoactuator drive satisfies the particular performance characteristic is substantially the same for a predetermined consecutive number of times, the initial reference phase difference adjustor is controlled to not increase nor decrease the reference phase difference for a pre-specified period of time.

11. A drive circuit for a piezoactuator as described in claim [9] *6*, wherein the frequency control unit comprises a frequency counter for measuring the frequency of the AC drive voltage signal, and wherein the drive evaluator determines whether or not the piezoactuator satisfies the particular performance characteristic based on whether or not the frequency measured by the frequency counter is within a predetermined range.

12. A drive circuit for a piezoactuator[as described in claim 6], *comprising:*

*at least one piezoelectric element having a first oscillation mode and a second oscillation mode, the at least one piezoelectric element being adapted to oscillate when an AC signal is applied to it, the second oscillation mode having a different oscillation direction than that of the first oscillation mode;*

*a driver for applying an AC drive voltage signal to the at least one piezoelectric element; and*

*a frequency control unit for detecting a first electrical signal from the at least one piezoelectric element indicative of oscillation in the first oscillation mode, for detecting a second electrical signal from the at least one piezoelectric element indicative of oscillation in the second oscillation mode, and for controlling the frequency of the AC drive voltage signal to optimize the phase difference between the first and second electrical signals for a particular operating condition of the at least one piezoelectric element, wherein the frequency control unit comprises a circuit for controlling the frequency of the AC drive voltage signal so that the phase difference substantially corresponds to a reference phase difference,* wherein the frequency control unit further comprises:

means for obtaining, each time the piezoactuator is driven, an indication of a change in the phase difference between the first and second electrical signals from a previous drive operation of the piezoactuator; and means for increasing or decreasing the reference phase difference according to the change in the phase difference.

13. A method for controlling a drive circuit having at least one oscillatible piezoelectric element of a piezoactuator, the method comprising the steps of:

applying an AC drive voltage signal to the at least one piezoelectric element;

outputting an output signal having a frequency corresponding to a frequency of a control voltage;

receiving a first electrical signal from the at least one piezoelectric element indicative of oscillation in a first oscillation mode and receiving a second electrical signal from the at least one piezoelectric element in indicative of oscillation in a second oscillation mode, the second oscillation mode having an oscillation direction different from that of the first oscillation mode;

detecting a phase different between the first and second electrical signals; and optimizing the oscillation frequency of the output signal based on the detected phase difference, *comprising increasing the oscillation frequency if a time differential of the detected phase difference is greater than zero, and decreasing the oscillation frequency if the time differential is less than zero, the increasing or decreasing being performed until the time differential of the phase difference over a pre-specified period of time is within a specified range.*

[14. A method as described in claim 13, wherein the optimizing of the oscillation frequency comprises increasing the oscillation frequency if a time differential of the detected phase difference is greater than $(d/dt)_1$, where $(d/dt)_1$ is greater than zero, and decreasing the oscillation frequency if the time differential is less than $(d/dt)_2$, where $(d/dt)_2$ is less than zero, the increasing or decreasing being performed until the time differential of the phase difference over a pre-specified period of time is between $(d/dt)_1$ and $(d/dt)^2$.]

[15. A method as described in claim 13, wherein the optimizing of the oscillation frequency comprises increasing the oscillation frequency until the detected phase difference is greater than or equal to a reference phase difference.]

16. A method [as described in claim 15, further comprising a step of] *for controlling a drive circuit having at least one oscillatible piezoelectric element of a piezoactuator, the method comprising the steps of:*

*applying an AC drive voltage signal to the at least one piezoelectric element;*

*outputting an output signal having a frequency corresponding to a frequency of a control voltage;*

*receiving a first electrical signal from the at least one piezoelectric element indicative of oscillation in a first oscillation mode and receiving a second electrical signal from the at least one piezoelectric element indicative of oscillation in a second oscillation mode, the second oscillation mode having an oscillation direction different from that of the first oscillation mode;*

*detecting a phase difference between the first and second electrical signals;*

*optimizing the oscillation frequency of the output signal based on the detected phase difference, wherein the optimizing of the oscillation frequency comprises increasing the oscillation frequency until the detected phase difference is greater than or equal to a reference phase difference; and* determining if driving the piezoactuator satisfies a particular performance characteristic, and correcting the reference phase difference based on the determination.

17. A device-readable medium embodying a control program for controlling a drive circuit having at least one oscillatible piezoelectric element of a piezoactuator, the control program comprising*:* applying an AC drive voltage signal to the at least one piezoelectric element;

outputting an output signal of a frequency corresponding to a frequency control voltage;

receiving a first electrical signal from the at least one piezoelectric element indicative of oscillation in a first oscillation mode and receiving a second electrical signal from the at least one piezoelectric element indicative of oscillation in a second oscillation mode, the second oscillation mode having an oscillation direction different from that of the first oscillation mode;

detecting a phase difference between the first and second electrical signals; and optimizing the oscillation frequency of the output signal based on the detected phase difference*, comprising increasing the oscillation frequency if a time differential of the detected phase difference is greater than zero, and decreasing the oscillation frequency if the time differential is less than zero, the increasing or decreasing being performed until the time differential of the phase difference over a pre-specified period of time is within a specified range.*

18. A device-readable medium as described in claim 17, wherein the medium comprises a physical storage device or an electromagnetic signal on which the program of instructions is carried.

19. A portable electronic device, comprising:

a piezoactuator comprising at least one piezoelectric element having a first oscillation mode and a second oscillation mode, the at least one piezoelectric element being adapted to oscillate when an AC signal is applied to it, the second oscillation mode having a different oscillation direction than that of the first oscillation mode; and a drive circuit comprising:

a driver for applying an AC drive voltage signal to the at least one piezoelectric element; and a frequency control unit for detecting a first electrical signal from the at least one piezoelectric element indicative of oscillation in the first oscillation mode, for detecting a second electrical signal from the at least one piezoelectric element indicative of oscillation in the second oscillation mode, and for controlling the frequency of the AC drive voltage signal to optimize the phase difference between the first and second electrical signals for a particular operating condition*, such that the phase difference is substantially maximized, the frequency control unit further comprising:*

*a phase difference detection circuit for detecting the phase difference between the first and second electrical signals;*

*a time differentiating circuit for determining a time differential of the phase difference detected by the phase difference detection circuit; and*

*a frequency adjusting circuit for increasing the frequency of the AC drive voltage signal when the time differential is positive, and decreasing the frequency of the AC drive voltage signal when the time differential negative.*

20. A portable electronic device as described in claim 19, wherein the portable electronic device is a wristwatch comprising:

a rotor adapted to be rotationally driven by the piezoactuator; and a display mechanism linked to the rotor for displaying information related to time.

21. A portable electronic device as described in claim 19, wherein the portable electronic device is a contactless IC card.

*22. A portable electronic device, comprising the drive circuit for a piezoactuator as described in claim 6.*

* * * * *